(12) United States Patent
Yang et al.

(10) Patent No.: US 8,355,704 B2
(45) Date of Patent: Jan. 15, 2013

(54) METHOD AND SYSTEM FOR IMPLEMENTING INTERCONVERSION BETWEEN RING BACK TONE AND RINGING TONE

(75) Inventors: Xin Yang, Shenzhen (CN); Jieping Zhong, Shenzhen (CN); Xiaoqian Chai, Shenzhen (CN); Guobing Min, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1116 days.

(21) Appl. No.: 11/935,896

(22) Filed: Nov. 6, 2007

(65) Prior Publication Data

US 2008/0293390 A1 Nov. 27, 2008

(30) Foreign Application Priority Data

Nov. 6, 2006 (CN) .......................... 2006 1 0138229
Feb. 9, 2007 (CN) .......................... 2007 1 0079211
May 17, 2007 (CN) .......................... 2007 1 0107886

(51) Int. Cl.
*H04M 3/42* (2006.01)
(52) U.S. Cl. ...................... 455/414.1; 455/405; 455/417; 455/418; 455/419; 455/420; 370/310.2; 370/328; 379/207.02; 379/201.01
(58) Field of Classification Search .................. 455/405, 455/414.1, 417, 418–420; 370/310, 310.2, 370/328, 207.02, 201.01
See application file for complete search history.

(56) References Cited

U.S. PATENT DOCUMENTS

| | | | |
|---|---|---|---|
| 7,509,149 B2 * | 3/2009 | Shim et al. .................... | 455/567 |
| 2004/0032946 A1 | 2/2004 | Koser | |
| 2005/0105706 A1 * | 5/2005 | Kokkinen ................ | 379/201.01 |
| 2005/0180554 A1 * | 8/2005 | Alston et al. ............ | 379/207.16 |
| 2007/0147597 A1 * | 6/2007 | Bangor et al. ........... | 379/207.02 |
| 2007/0294425 A1 * | 12/2007 | Sobti et al. ..................... | 709/231 |

FOREIGN PATENT DOCUMENTS

| | | |
|---|---|---|
| CN | 1913558 A | 2/2007 |
| KR | 20030075930 (A) | 9/2003 |
| KR | 10-0578654 | 5/2006 |

(Continued)

OTHER PUBLICATIONS

English language translation of Written Opinion for PCT/CN2005/001811.

(Continued)

*Primary Examiner* — Steve D Agosta
(74) *Attorney, Agent, or Firm* — Conley Rose, P.C.; Grant Rodolph; Rayhao Chung

(57) ABSTRACT

A method and a system for implementing interconversion between a ring back tone and a ringing tone are disclosed. The method for converting the ring back tone into the ringing tone includes: configuring ring back tone information for a user according to a ring back tone configuration request; obtaining relevant data of corresponding ringtone information according to the ring back tone information configured, and sending the relevant data to a user terminal. The method for converting the ringing tone into the ring back tone includes: generating a ring back tone configuration request according to ringing tone configuration information, where a user terminal configures the ringing tone with the ringing tone configuration information; and configuring the ring back tone corresponding to the ringing tone to be a ring back tone information of the user terminal according to the ringing tone configuration information in the ring back tone configuration request.

19 Claims, 11 Drawing Sheets

FOREIGN PATENT DOCUMENTS

| KR | 10-0578654 B1 | 5/2006 |
|---|---|---|
| KR | 10-0578724 B1 | 5/2006 |
| KR | 10-2006-0068155 | 6/2006 |
| KR | 10-2006-0068155 A | 6/2006 |
| KR | 10-2006-0069577 A | 6/2006 |
| WO | 2005/006721 A | 1/2005 |
| WO | 2006/032946 A1 | 6/2006 |

OTHER PUBLICATIONS

Sep. 14, 2010 Chinese Office Action regarding application No. 200780000254.1.

Partial English translation of Sep. 14, 2010 Chinese Office Action regarding application No. 200780000254.1.

Oct. 13, 2010 European Office Action regarding application No. 07021562.9.

Office Action issued in Russian Patent Application No. 2009120444/09 on Dec. 1, 2010, with English-language translation.

Foreign communication from a counter-part application, International Search Report PCT/CN2007/070709, Dec. 27, 2007, 3 pages.

Foreign communication from a counter-part application, Written Opinion PCT/CN2007/070709, Dec. 27, 2007, 6 pages.

Foreign communication from a counter-part application, European Search Report, EP Application 07021562.9, Jan. 17, 2008, 5 pages.

Foreign communication from a counter-part application, European application 07021562.9, Office Action dated Oct. 21, 2011, 3 pages.

Foreign Communication From a Related Counterpart Application, Korean Application 10-2009-7011730, Korean Office Action dated Dec. 26, 2011, 3 pages.

Foreign Communication From a Related Counterpart Application, European Application 07021562.9-1246, European Office Action dated Nov. 8, 2012, 4 pages.

* cited by examiner

METHOD AND SYSTEM FOR IMPLEMENTING INTERCONVERSION BETWEEN RING BACK TONE AND RINGING TONE

The present application claims priorities of Chinese Patent Applications No. 200610138229.7, titled "METHOD AND DEVICE FOR OBTAINING RINGTONE ON TERMINAL SIDE", filed on Nov. 6, 2006; No. 200710079211.9, titled "METHOD, DEVICE AND SYSTEM FOR CONFIGURING RING BACK TONE AND RINGING TONE", filed on Feb. 9, 2007; No. 200710107886.X, titled "METHOD, SYSTEM AND DEVICE FOR IMPLEMENTING INTERCONVERSION BETWEEN RING BACK TONE AND RINGING TONE", filed on May 17, 2007; and PCT Application PCT/CN2007/070709, titled "METHOD, SYSTEM AND DEVICE FOR IMPLEMENTING INTERCONVERSION BETWEEN RING BACK TONE AND RINGING TONE", filed on Sep. 17, 2007, the whole contents of which are incorporated herein by reference.

FIELD OF THE INVENTION

The present invention relates to the technical field of communications, in particular to the ringtone processing technology, and specifically to a method and a device for configuring the ring back tone and the ringing tone as well as a method and a system for synchronization between the ring back tone and the ringing tone.

BACKGROUND OF THE INVENTION

Ring back tone is an audio played for a calling party before a called party picks up the telephone and answers the call initiated by the calling party. The coloring ring back tone service developed presently becomes more and more popular due to its strongly customizable service. In the coloring ring back tone service, various audio files may be played for the calling party in accordance with the configuration of the user, and further, different ring back tones may be configured for different calling parties. For example, a group ring back tone or a default ring back tone may be configured. As for the group ring back tone, an audio file is configured for a contact group in the address book by the user, the sound of the audio file is the ring back tone for the group. As a contact user of the contact group initiates a call to the user, the contact user who is a calling party will hear the sound of this audio file. As for the default ring back tone, there is no special ring back tone configured for the contact users in the address book by the user. Therefore, when such a contact user initiates a call to the user, the default ring back tone configured by the user may be heard by the contact user. The coincidence relation between the calling party and the audio file configured by the user is stored in a ring back tone platform. When a calling party initiates a call, the ring back tone platform plays the corresponding audio file for the calling party in accordance with the stored coincidence relation between the calling party and the audio file.

Ringing tone is an audio played for the called party by the user terminal of the called party when the user is called. The user may configure different ringing tones for different calling parties via the user terminal, such as a group ringing tone and a default ringing tone. As for the group ringing tone, it means that an audio file is configured for a contact group in the address book by the user, the sound of the audio file is the ringing tone for the group. When a contact user of the contact group initiates a call to the user, the called party will hear the sound of the corresponding audio file. As for the default ringing tone, it means that no special ringing tone is configured for the contact users in the address book by the user. Therefore, when such a contact user initiates a call to the user, the default ringing tone configured by the user may be heard by the called party.

Presently, there exist three ring back tone schemes, i.e. intelligent network scheme, calling party end office scheme and called party end office scheme. An example of the present schemes includes following steps:

Step A: a calling party initiates a call to a service switching point (SSP), the SSP triggers an intelligent service in accordance with a ring back tone service tag in the call, and reports the tag to a service control point (SCP), the SCP obtains the ring back tone number and sends the number to the SSP.

Step B: the SSP initiates a call to the called party and the ring back tone platform respectively in accordance with the ring back tone number obtained.

Step C: a voice channel via the SSP is determined under the control of the SSP, where the voice channel connects the called party and the calling party, and a voice channel via the SSP is established and activated under the control of the SSP, where the voice channel connects the ring back tone platform and the calling party.

Step D: the ring back tone platform plays a coloring ring back tone for the calling party via the voice channel between the ring back tone platform and the calling party.

Step E: the called party picks up the telephone, so as to activate the voice channel between the calling party and the called party, and the calling party and the called party communicate with each other through the voice channel. Meanwhile, the SSP terminates the connection with the ring back tone platform and releases the resources of the ring back tone platform.

FIG. 1 is a schematic diagram showing the architecture of a system for downloading and configuring the ringing tone in the prior art. As shown in FIG. 1, the system includes: a ringing tone download server, a push proxy gateway (PPG), a wireless application protocol (WAP) gateway and a mobile terminal. The ringing tone download server is adapted to provide the PPG with information of the ringing tone selected by the user, and provide the mobile terminal with the ringing tone via the WAP gateway in accordance with a ringing tone downloading request from the mobile terminal. The PPG is adapted to constitute a Push message in accordance with the ringing tone information from the ringing tone download server, and send the Push message including ringing tone download information to the mobile terminal. The mobile terminal is adapted to connect with the WAP gateway in accordance with the Push message from the PPG, send a ringing tone downloading request to the ringing tone download server via the WAP gateway, and download the ringing tone provided by the ringing tone download server via the WAP gateway. Since the information exchange between the mobile terminal and the WAP gateway is implemented based on WAP, and the information exchange between the WAP gateway and the ringing tone download server is implemented based on the hyper text transfer protocol (HTTP), the WAP gateway is adapted to implement the protocol conversion for the information that is exchanged between the mobile terminal and the ringing tone download server. Further, the mobile terminal is adapted to configure the received ringing tone as the ringing tone for a corresponding contact user in the address book in accordance with the operation of the user. The PPG is mainly adapted to implement the active push of the information, receive the push request of the WAP information from the ringing tone download server, and provide the mobile terminal with the WAP information.

Further, the information exchange between the ringing tone download server and the PPG is implemented based on the Push Access Protocol (PAP), and the information exchange between the PPC and the mobile terminal is implemented based on the Push Over-The-Air protocol (P-OTA).

The user may log on the ringing tone download server via PC or mobile terminal and select the ringing tone to be downloaded. When the user logs on the ringing tone download server via PC, the PC logs on the ringing tone download server through Internet, and the user may select the ringing tone to be downloaded through the interaction between the PC and the ringing tone download server. When the user logs on the ringing tone download server via the mobile terminal, the mobile terminal logs on the ringing tone download server through the WAP gateway, and the user may select the ringing tone to be downloaded through the interaction between the mobile terminal and the ringing tone download server.

FIG. 2 is a diagram showing the flow chart for downloading and configuring the ringing tone in the prior art. As shown in FIG. 2, the process of downloading and configuring the ringing tone includes the following steps:

Step 201-Step 202: a user logs on the ringing tone download server via PC or mobile terminal, and selects the ringing tone to be downloaded through the interaction between the ringing tone download server and the PC or the mobile terminal.

Step 203: when the ringing tone to be downloaded is selected by the user, the ringing tone download server provides the PPG with information of the ringing tone selected by the user.

Step 204: when the PPG receives the ringing tone information, it constitutes a Push message according to the ringing tone information, and then sends the Push message including the download information of the ringing tone to the mobile terminal. In the subsequent steps, the mobile terminal is considered, and PC is not considered.

Step 205-Step 206: the mobile terminal receives the Push message, connects to the WAP gateway in accordance with the Push message, and sends a ringing tone downloading request to the WAP gateway. When the WAP gateway receives the ringing tone downloading request, it sends the ringing tone downloading request to the ringing tone download server, and requests to download the corresponding ringing tone.

Step 207: after receiving the ringing tone downloading request, the ringing tone download server provides the WAP gateway with the ringing tone selected by the user.

Step 208: after receiving the ringing tone, the WAP gateway provides the mobile terminal with the ringing tone selected by the user.

Step 209: after receiving the ringing tone, the mobile terminal sends a reception acknowledgement to the WAP gateway, for notifying the WAP gateway that the ringing tone is successfully received.

Step 210: after receiving the reception acknowledgement, the WAP gateway sends the ringing tone sending result to the ringing tone download server, for notifying the ringing tone download server to complete the present ringing tone download.

Step 211: when receiving the ringing tone, the mobile terminal may configure the ringing tone to be the ringing tone for the corresponding contact user in the address book according to the operation of the user.

There is no evident temporal sequence when executing Step 209-Step 210 and Step 211. Step 209-Step 210 and Step 211 may be executed at the same time; or it is possible to execute Step 209-Step 210 first, and then execute Step 211; or it is also possible to execute Step 211 first, and then execute Step 209-Step 210.

FIG. 3 is a schematic diagram showing the system for configuring the ring back tone in the prior art. As shown in FIG. 3, the system includes: peripheral equipment, a WEB server and a ring back tone platform. The peripheral equipment is adapted to log on the ring back tone platform via the WEB server, and request the ring back tone platform to configure the ring back tone. The ring back tone platform is adapted to configure the ring back tone of the user terminal in accordance with the ring back tone configuring request, and store the coincidence relation between the ring back tone configured and the calling party. The WEB server is adapted to implement the protocol conversion for the information exchanged between the peripheral equipment and the ring back tone platform. The information exchange between the peripheral equipment and the WEB server is implemented based on HTTP, and the information exchange between the WEB server and the ring back tone platform is implemented based on the Simple Object Access Protocol (SOAP). The peripheral equipment may be a PC.

FIG. 4 is a diagram showing the flow chart of configuring the ring back tone in the prior art. As shown in FIG. 4, the process of configuring the ring back tone includes the following steps:

Step 401: the peripheral equipment requests to log on the ring back tone platform, the ring back tone platform performs authentication on the peripheral equipment. When the authentication is passed, the peripheral equipment logs on the ring back tone platform.

Step 402-Step 403: the peripheral equipment sends a ring back tone configuring request to the WEB server, requests to configure the ring back tone. When the ring back tone configuring request is received, the WEB server sends the ring back tone configuring request to the ring back tone platform.

Step 404: when the ring back tone configuring request is received, the ring back tone platform configures the ring back tone for the user terminal in accordance with the ring back tone configuring request, and stores the coincidence relation between the calling party and the ring back tone configured.

Step 405-Step 406: when the configuration of the ring back tone is finished, the ring back tone platform returns the ring back tone configuring result to the WEB server, so as to notify the peripheral equipment that the ring back tone is successfully configured. When the ring back tone configuring result is received, the WEB server sends the ring back tone configuring result to the peripheral equipment.

During the research, it is found by the inventor that interconversion between the ringing tone and the ring back tone cannot be implemented in the prior art.

Since the ringing tone and the ring back tone cannot be interconverted into each other in the prior art, it cannot be ensured that the ringing tone and the ring back tone of the same sound may be stored on the terminal and the network side. Even if the ringing tone and the ring back tone of the same sound are stored on the terminal and the network side, because the configuration of the ringing tone and the ring back tone is separated and no correlation exists between them, the configuration has to be initiated and performed respectively, when a user wants to configure the same ringing tone and ring back tone for a contact user or contact group. Therefore, the configuration of the ringing tone and the ring back tone has to be initiated respectively by the user, the operation is fussy, and much inconvenience is brought about with the user, and is not good for the development and application of the ring back tone service and the ringing tone download service.

SUMMARY OF THE INVENTION

The present invention provides a method and a system for the interconversion of a ring back tone between a ringing tone. The present invention provides a scheme for converting a ring back tone into a ringing tone, and provides a scheme for converting the ringing tone into the ring back tone as well.

The present invention provides a method for configuring a ringing tone according to a ring back tone, including:

configuring ring back tone information for a user according to a ring back tone configuration request;

obtaining relevant data of corresponding ringtone information according to the ring back tone information configured, and sending the relevant data to a user terminal;

wherein the relevant data is configured to enable the user terminal to obtain the ringing tone through the relevant data, and the ringing tone is adapted to configure a ringing tone for the user terminal.

The present invention provides a method for configuring a ring back tone according to a ringing tone, including:

generating a ring back tone configuration request according to ringing tone configuration information, where a user terminal configures the ringing tone with the ringing tone configuration information; and configuring the ring back tone corresponding to the ringing tone to be a ring back tone information of the user terminal according to the ringing tone configuration information in the ring back tone configuration request.

The present invention provides a system for configuring a ringing tone according to a ring back tone, including:

a network element configured to:

configure ring back tone information for a user according to a ring back tone configuration request;

obtain relevant data of corresponding ringtone information according to the ring back tone information configured, and send the relevant data to a user terminal;

wherein the relevant data is configured to enable the user terminal to obtain the ringing tone with the relevant data, and the ringing tone is adapted to configure a ringing tone for the user terminal.

The present invention provides a system for configuring a ring back tone according to a ringing tone, including:

a ring back tone platform, configured to classify the ring back tone corresponding to the ringing tone into a ring back tone pool of the user terminal according to the ringing tone configuration information reported by the user terminal; and a network element, configured to:

generate a ring back tone configuration request according to ringing tone configuration information, where the user terminal configures the ringing tone with the ringing tone configuration information; and configure the ring back tone corresponding to the ringing tone to be a ring back tone information of the user terminal according to the ringing tone configuration information in the ring back tone configuration request.

The present invention further provides a A system for implementing interconversion between a ringing tone and a ring back tone, including:

a ringtone management module capable of configuring the ring back tone, and triggering a ringing tone data dispatching module;

a terminal ringing tone data module capable of storing a terminal ringing tone corresponding to the ring back tone stored in a ring back tone data module;

a ringing tone data dispatching module capable of searching for the terminal ringing tone corresponding to the configured ring back tone in the terminal ringing tone data module, and send relevant data of the terminal ringing tone to a user terminal.

The present invention provides a terminal, including:

a first management object saving module capable of saving a management object, MO, the MO is used to dispatch relevant data of a terminal ringing tone corresponding to a ring back tone; and an obtaining module capable of obtaining the terminal ringing tone according to a relevant data, the relevant data is obtained by operating an MO saved in the first management object saving module.

The present invention further provides another terminal, including:

a receiving unit and a ringing tone configuring unit, wherein the receiving unit is configured to receive a ringtone corresponding to ring back tone configuration information, the ringing tone configuring unit is adapted to configure the ringtone to be the ringing tone; and/or a ring back tone configuring unit, adapted to configure the ringing tone, and generate a ring back tone configuration request according to ringing tone configuration information.

The present invention provides a system, comprising:

a notifying unit, configured to notify a ringing tone download server of ring back tone configuration information after finishing a ring back tone configuration; and/or a receiving unit and a configuring unit, wherein the receiving unit is configured to receive ringing tone configuration information from the ringing tone download server or a WEB server, the configuring unit is adapted to configure a ring back tone of a user terminal according to the ringing tone configuration information The present invention further provides a ringing tone download server, including:

a requesting unit, configured to send a ring back tone configuration request generated according to configuration information, where a user terminal configures ringing tone information with the configuration information; and/or a file providing unit, configured to provide the user terminal with ringtone information corresponding to ring back tone configuration information according to ring back tone configuration information In the solution provided by the invention, the network side determines the relevant of the ringing tone corresponding to the ring back tone configured, and dispatches the relevant data to the user terminal. The user terminal obtains the ringing tone according to the relevant data. Thus, the conversion from the ring back tone into the ringing tone is realized.

In the solution provided by the invention, the user terminal reports the ringing tone configuration result to the ring back tone after finishing the ringing tone configuration. The ring back tone platform classifies the ring back tone corresponding to the ringing tone into the ring back tone pool of the user terminal according to the ringing tone configuration result. Thus, the conversion from the ringing tone into the ring back tone is realized.

DETAILED DESCRIPTION OF THE EMBODIMENTS

Figure 1:
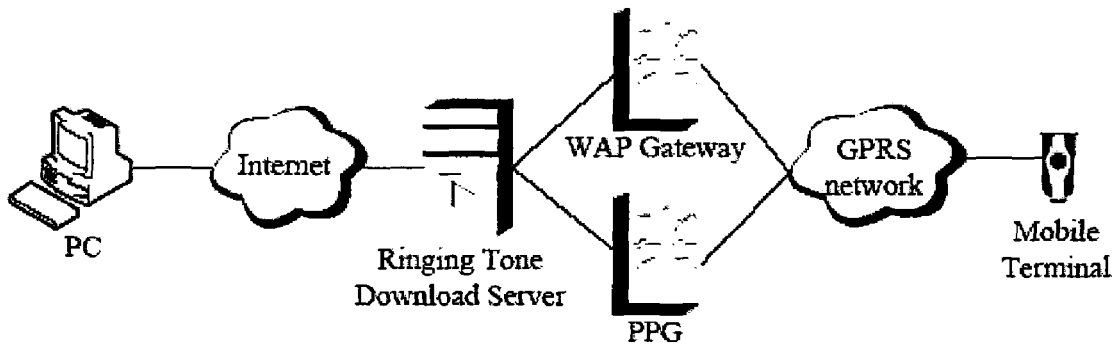
FIG. 1 is a schematic diagram showing the architecture of a system for downloading and configuring the ringing tone in the prior art.
Figure 2:
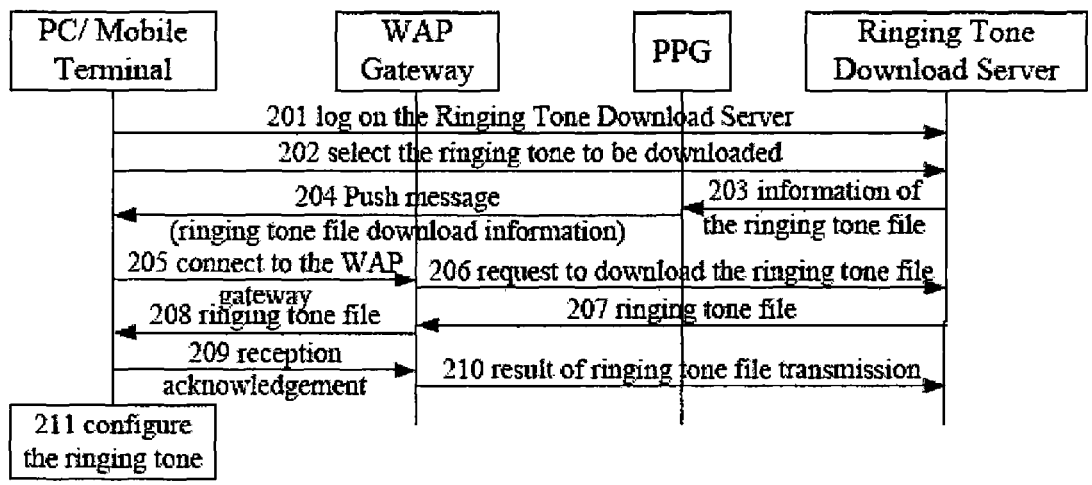
FIG. 2 is a diagram showing the flow chart for downloading and configuring the ringing tone in the prior art.
Figure 3:
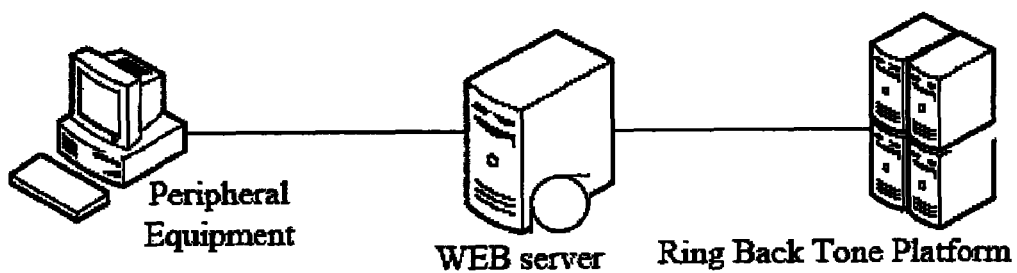
FIG. 3 is a schematic diagram showing the architecture of a system for configuring the ring back tone in the prior art.
Figure 4:
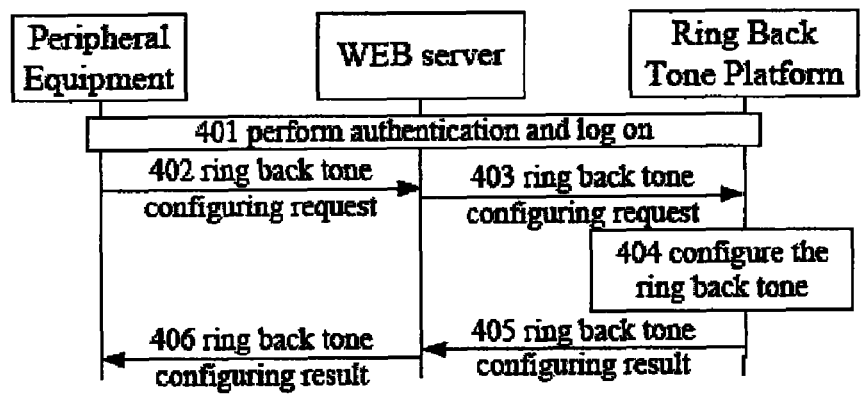
FIG. 4 is a diagram showing the flow chart of configuring the ring back tone in the prior art.
Figure 5:
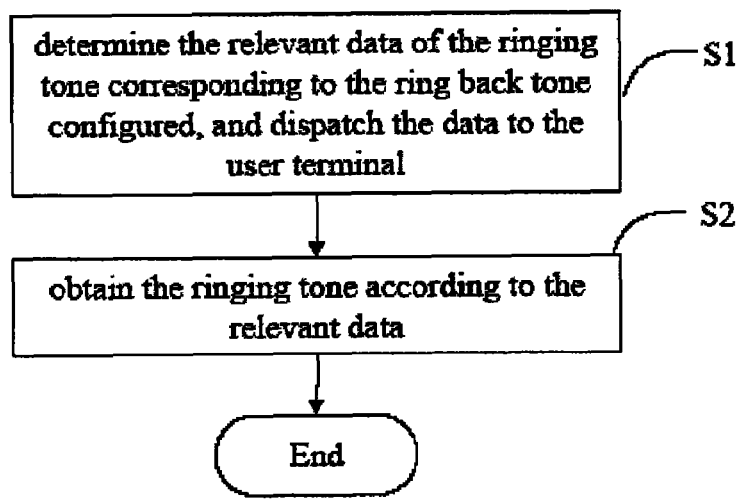
FIG. 5 is a diagram showing the flow chart of the steps in a method according to an embodiment of the invention.

There is provided a method for converting the ring back tone into the ringing tone according to an embodiment of the invention, so as to be able to convert the ring back tone into the ringing tone on a terminal. As shown in FIG. 5, the method mainly includes the following steps:

Block 1: the network side determines the relevant data of the ringing tone corresponding to the configured ring back tone, and dispatches the data to the user terminal.

Block 2: the user terminal obtains the ringing tone in accordance with the relevant data.

A first embodiment of the present invention provides a method for converting the ring back tone into the ringing tone according to the present invention, includes the following steps:

Step 101: the ring back tone platform on the network determines a relevant data of a ringing tone corresponding to a configured ring back tone.

As the ring back tone is stored in the ring back tone data base and the ringing tone are all numbered, the ring back tone may be a normal ring back tone such as a ringtone that includes audio, the ring back tone may be a multimedia ring back tone such as a ringtone includes audio, video or picture etc. The ring back tone platform may determine the ringing tone corresponding to the configured ring back tone with the coincidence relation between the ring back tone number and the ringing tone number, and then may further determine the relevant data. The ring back tone number and the corresponding ringing tone number may be identical. In this case, the ring back tone platform directly searches for the ringing tone number that is same as the ring back tone number, so as to determine the ringing tone corresponding to the configured ring back tone. Alternatively, the rule for numbering the ring back tone and the ringing tone may be different, then the ring back tone number and the corresponding ringing tone number may be different. In this case, the coincidence relation between the ring back tone number and the ringing tone number may be obtained with the rule for numbering the ring back tone and the ringing tone, and further, the ringing tone corresponding to the configured ring back tone may be determined.

There are two examples with respect to the relevant data:

As for one example, the relevant data determined by the ring back tone platform is the ringing tone itself.

As for another example, the relevant data determined by the ring back tone platform is a download link URL for the ringing tone.

Step 102: the ring back tone platform dispatches the relevant data to the user terminal.

In this process, the ring back tone platform may dispatch the relevant data of the ringing tone corresponding to the ring back tone to a data management system (DMS) at first.

Subsequently, the DMS determines whether a management object (MO) for dispatching the relevant data exists in the user terminal. If the relevant data exists in the user terminal, the DMS operates the MO directly so as to dispatch the relevant data to the user terminal.

Otherwise, the DMS sends an MO for dispatching the relevant data to the user terminal. The user terminal stores the MO sent by the DMS. The DMS operates the MO stored in the user terminal so as to dispatch the relevant data to the user terminal.

Alternatively, the relevant data may be carried on a node of the MO directly, so as to be dispatched to the user terminal, when the DMS sends the MO for dispatching the relevant data to the user terminal.

The DMS may also not determine whether the MO for dispatching the relevant data exists on the user terminal and send the MO for dispatching the relevant data directly. The specific process is the same as described above.

Corresponding to the two examples of the relevant data in the Step 101, there are two examples of dispatching the relevant data:

As for the first example, the DMS obtains the information of the ringtone in the user terminal. The DMS sends the ringing tone to the user terminal as the ringing tone does not exist. Alternatively, the DMS may send the ringing tone to the user terminal directly.

As for a second example, the DMS obtains the information of the ringtone in the user terminal. The DMS sends the download link and download command to the user terminal as the ringing tone does not exist. Alternatively, the DMS may send the download link and download command to the user terminal directly.

S103: The user terminal obtains the ringing tone in accordance with the relevant data.

Corresponding to the first example in the Step 101, the user terminal receives and stores the ringing tone sent by the DMS.

Corresponding to the second example in the Step 101, the user terminal executes the download command sent by the DMS and downloads the ringing tone from the download link sent by the DMS.

Thus, obtaining the ringing tone corresponding to the ring back tone automatically on the terminal is accomplished.

The user terminal may also adopt a corresponding ringing tone as the active ringing tone according to the command from the network side, so as to realize the synchronization between the ring back tone and the ringing tone automatically, even for a logically complex configuration of the ring back tone. There exist two modes for sending the instruction by the network side.

Mode 1: The MO is sent in a DM mode, so as to implement the configuration of the ringing tone on the user terminal.

The ring back tone platform correspondingly instructs the DMS to configure the ringing tone for the user terminal, when an instruction of configuring the terminal ringing tone is received. In accordance with the instruction sent by the ring back tone platform, the DMS configures the ringing tone by sending a configuring MO to the user terminal and operating the configuring MO, or by operating the configuring MO available in the user terminal directly. The configuring MO sent to the user terminal by the DMS and the MO for dispatching the relevant data may be sent to the user terminal together, or they may be sent to the user terminal separately. In other words, the DMS may dispatch the relevant data of the ringing tone and configure the ringtone on the terminal simultaneously, or the DMS may dispatch the relevant data of the ringing tone and configure the ringtone on the terminal separately.

If the instruction of configuring the terminal ringing tone received by the ring back tone platform carries a terminal ringing tone configuration strategy, and the terminal ringing tone configuration strategy includes a ringing duration of the ringing tone to be configured, such as a complex logic, the configuring MO sent by the DMS may include: an MO for configuring the ringing tone and a scheduling MO for processing the ringing duration. After the above Step, the DMS configures the scheduled task logic for the scheduling MO in accordance with the ringing duration. The scheduling MO triggers the task logic to operate a ringing tone MO, so as to implement the configuration of the ringing tone on the user terminal, when the conditions of the scheduling MO are fulfilled.

Mode 2: The ring back tone number is carried in a CONNECT instruction sent to the user terminal by the switching center, so that the user terminal rings according to the ring back tone number.

In the above process of Step 102, when the ring back tone platform dispatches the relevant data to the user terminal, a table of coincidence relation between the ring back tone number and the ringing tone number may be sent to the user terminal simultaneously and stored on the user terminal.

Upon performing the step 103, during the call connection, the switching center obtains the number of the present ring back tone from the ring back tone platform, and puts the number obtained into the CONNECT instruction sent to the user terminal. The user terminal extracts the number contained in the CONNECT instruction. After that, the user terminal searches locally for the ringing tone corresponding to the number received according to the table of coincidence relation between the ring back tone number and the ringing tone number, when the table is stored locally on the user terminal. Optionally the user terminal searches locally for the ringing tone with the same number, when the table of coincidence relation between the ring back tone number and the ringing tone number is not stored locally on the user terminal. When the relevant ringing tone is found, the user terminal rings by taking the found ringing tone as the active ringing tone. When the relevant ringing tone is not found, the user terminal rings with the active ringing tone.

The method presented by the invention will be illustrated in detail with the embodiments hereinafter.

Figure 6:
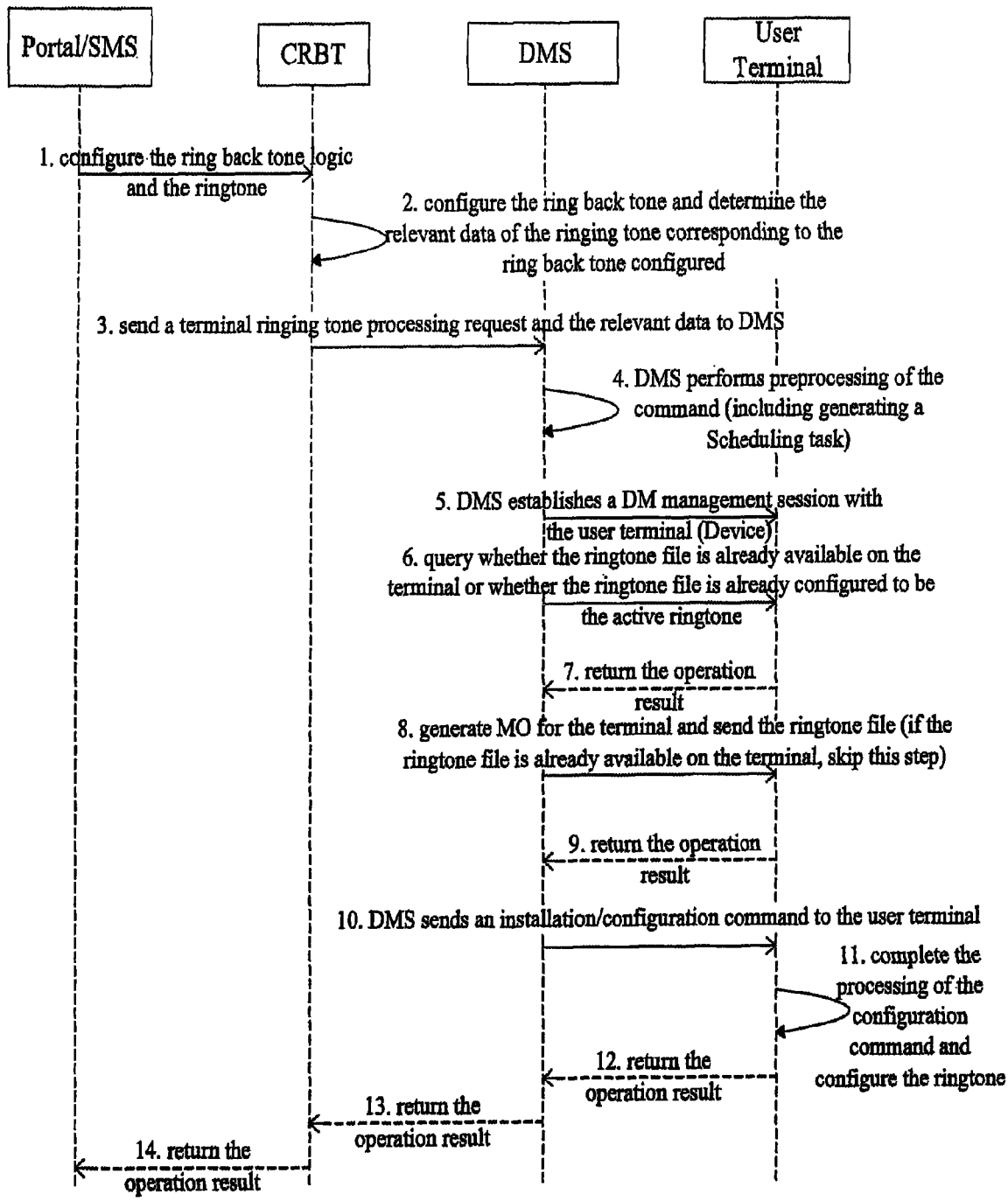
FIG. 6 is a diagram showing the flow chart of a second embodiment of the invention.

In a second embodiment of the present invention, a ringing tone is sent via a DM mode directly, and the configuration of the ringing tone on the user terminal is implemented via the MO. As shown in FIG. 6, the present embodiment includes following steps.

Step 1. A front end sends a logic command of configuring the ring back tone and an instruction of configuring the ringing tone to the coloring ring back tone server (CRBT). The front end may be a Portal or SMS etc., and the CRBT is included in the ring back tone platform.

Step 2. The CRBT configures the ring back tone, and determines the relevant data of the ringing tone corresponding to the configured ring back tone.

Step 3. The CRBT sends a ringing tone processing request and the relevant data to the DMS.

The relevant data may include: ringtone information: a unique identification of the ringtone, such as the ringtone ID, title, period of validity, size, author, copyright holder; configuration strategy: such as the strategy of changing the ringtone in accordance with the period of time; operation command: command of configuring the ringtone, command of deleting a specific ringtone; data of ringtone: the ringing tone itself. The specific implementation is as follows:

```
<?xml version="1.0" encoding="UTF-8"?>
<!-- -->
<Operations xmlns:xsd="'http://www.w3.org/2006/xmlschema'">
  <Operation ID="'urn:oma:mo:lfc:soundseting'">
    <Name>SetSound</Name>
    <Item>
      <SoundInfo>
        <SoundName>A</SoundName>
        <SoundID>601502000000001001</SoundID>
        <SoundExpire>2006.12.31</SoundExpire>
        <Size>8192</Size>
        <Author>X</Author>
        <CopyRight>X</CopyRight>
      </SoundInfo>
      <Type xmlns="syncml:metinf">bin</Type>
      <Data>---ringtone file A---</Data>
    </Item>
  </Operation>
</Operations>
```

Step 4. The DMS performs preprocessing, such as converting the format of the command. When a complex logic exists, the DMS may further determine the scheduled tasks.

Step 5. The DMS establishes a DM management session with the user terminal (Device).

Step 6. The DMS queries the ringtone information and the configuration information of the ringtone of the user terminal.

Step 7. The user terminal returns a query result to the DMS.

Step 8. The DMS generates an MO for dispatching the relevant data for the user terminal, an MO for configuring the ringing tone. The DMS may further generate a scheduling MO for processing the ringing duration as a complex logic exists. The DMS sends a generated MO to the user terminal, the MO generated will be generally referred to as SoundMO hereinafter. The DMS sends the ringing tone to the user terminal via the MO. An example of the SoundMO is shown in FIG. 7.

Figure 7:
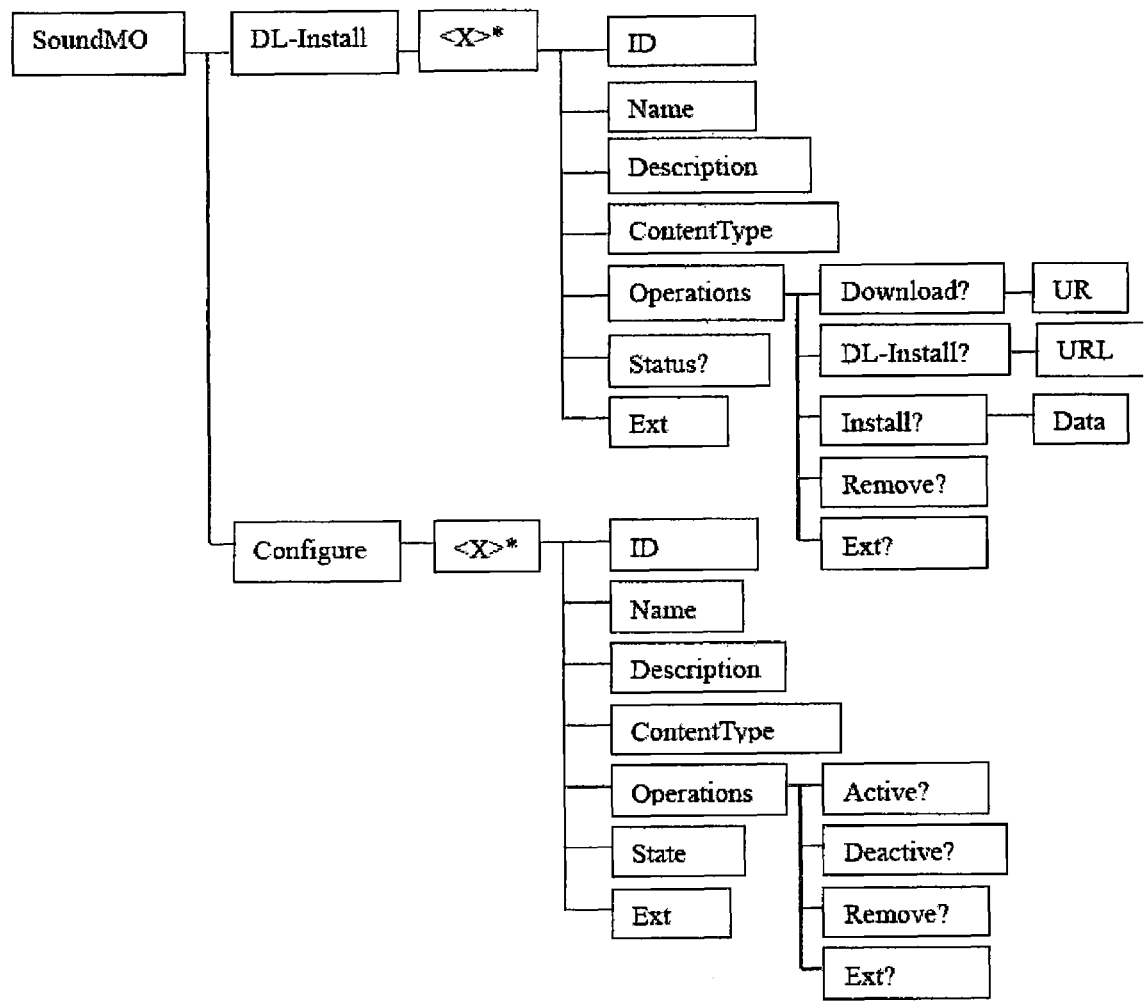
FIG. 7 is a diagram showing an example of the management object (MO) in an embodiment of the invention.

In FIG. 7, the ringing tone number, such as 601502000000001001, is stored on an ID node. This number corresponds to the configured ring back tone number.

The main node corresponding to the MO is as follows:

| | | <ContentType> | |
|---|---|---|---|
| Tree Node | Format | Minimum Access Right | Value |
| One | Chr | Get | Sound/Pic/ . . . |

This table indicates the format of the content indicated by the ID.

Downloading the ringtone file may be implemented by executing a Replace command for the Data node in FIG. 7 and sending the ringtone file directly to the Data node.

The command of downloading the ringtone is as follows:

```
<Replace>
<CmdID>1</CmdID>
    <Meta>
    <Format xmlns="syncml:metinf">bin</Format>
    <Type xmlns="syncml:metinf">bin</Type>
    </Meta>
    <Item>
        <Target>
            <LocURI>./ SoundMO /
            DL-
Install/S601502000000001001/Operations/Install/Data</LocURI>
        </Target>
        <Data>--- ringtone file ---</Data>
    </Item>
</Replace>
```

Remark: If it is indicated in Step 7 that this ringing tone is already stored in the user terminal, go to Step 10. If it is indicated in Step 7 that this ringing tone is already configured to be the active ringing tone by the user terminal, the process ends.

Step 9. The user terminal returns the operation result.

Step 10. The DMS sends an installation/configuration command to the user terminal.

The MO as shown in FIG. 7 executes an Exec command for an Install node as the download is completed, so as to accomplish the installation of the ringtone file. The installation means adding the ringtone file into the ringtone list in the terminal. The added ringtone may not necessarily be configured as the active ringtone. A command, such as an Exec command, for operating a ringtone configuring node (Active node) is issued, so as to configure the ringtone to be the active ringtone.

The command for installing and activating the ringtone is as follows:

```
<Sequence>
    <Exec>
    <CmdID>2</CmdID>
    <Item>
        <Target>
            <LocURI>./ SoundMO /
    DL-Install/S601502000000001001/Operations/Install</LocURI>
        </Target>
    </Item>
            </Exec>
    <Exec>
    <CmdID>3</CmdID>
    <Item>
        <Target>
            <LocURI>./ SoundMO
    /Configure/S601502000000001001/Operations/Active</LocURI>
        </Target>
    </Item>
            </Exec>
    </Sequence>
```

Step 11. The user terminal configures the ringing tone according to the command.

Step 12-14. The user terminal returns the configuration result to the network side.

Figure 8:
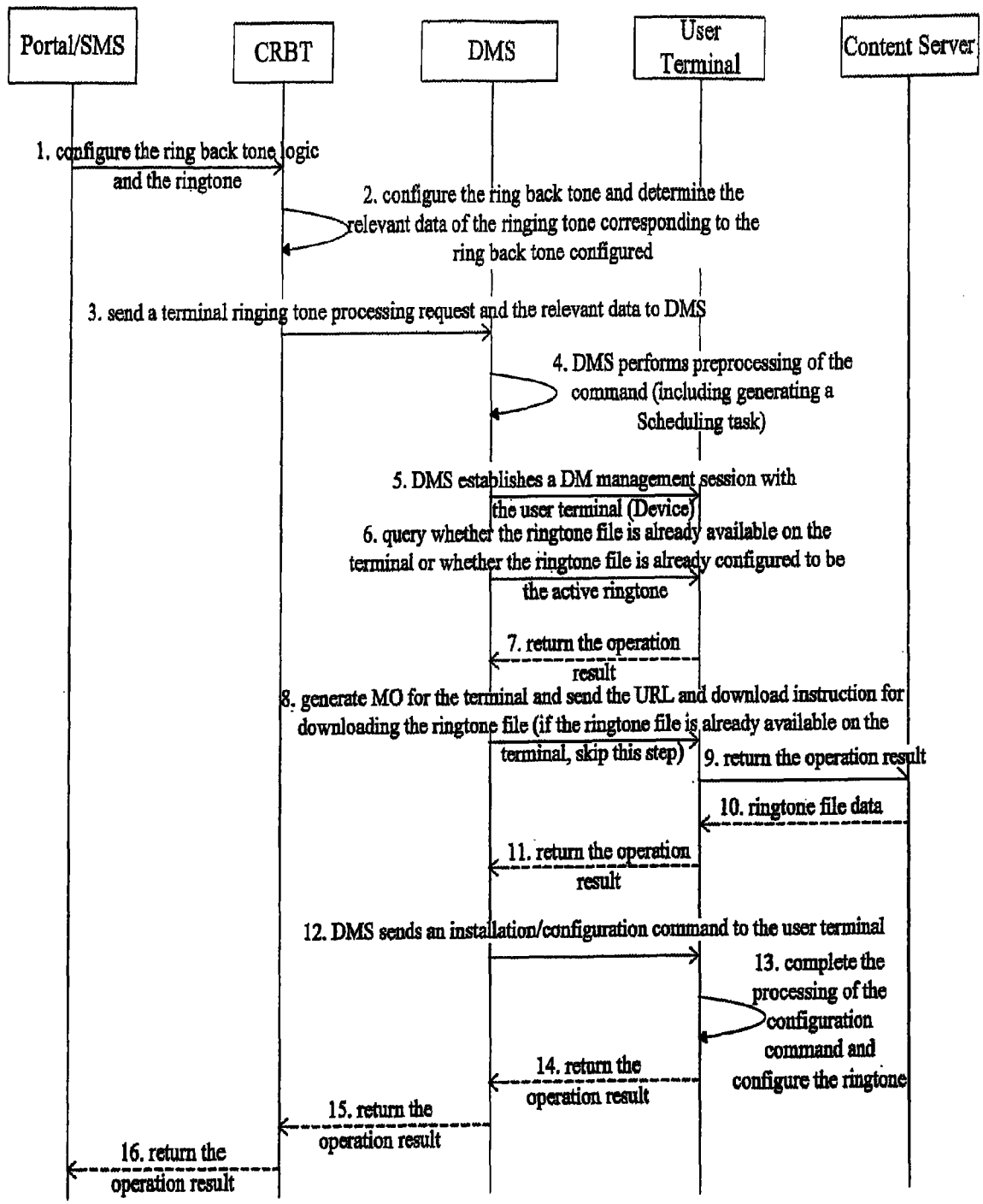
FIG. 8 is a diagram showing the flow chart of a third embodiment of the invention.

A third embodiment of present invention provides a download link of the ringtone is sent in a DM mode, and the configuration and downloading of the ringing tone is implemented via the MO. As shown in FIG. 8, the present embodiment includes following steps.

Step 1. A front end sends a logic command of configuring the ring back tone and an instruction of configuring the ringing tone to the coloring ring back tone server, the front end may be a Portal/SMS etc., and the CRBT is included in the ring back tone platform.

Step 2. The CRBT configures the ring back tone, and determines the relevant data of the ringing tone corresponding to the ring back tone configured.

Step 3. The CRBT sends a ringing tone processing request and the relevant data to the DMS.

The relevant data includes: ringtone information: a unique identification of the ringtone, such as the ringtone ID, title, period of validity, size, author, copyright holder; configuration strategy: such as the strategy of changing the ringtone in accordance with the period of time; operation command: command of configuring the ringtone, command of deleting a specific ringtone; data of ringtone: the URL address where the ringtone file is stored. The specific implementation is as follows:

```
<?xml version="1.0" encoding="UTF-8"?>
<!-- -->
<Operations xmlns:xsd="'http://www.w3.org/2006/xmlschema'">
<Operation ID="'urn:oma:mo:lfc:soundseting'">
    <Name>SetSound</Name>
    <Item>
        <SoundInfo>
            <SoundName>A</SoundName>
            <SoundID>601502000000001001</SoundID>
            <SoundExpire>2006.12.31</SoundExpire>
            <Size>8192</Size>
            <Author>X</Author>
            <CopyRight>X</CopyRight>
        </SoundInfo>
        <Type xmlns="syncml:metinf">chr</Type>
        <Data>---the URL for downloading the ringtone file ---</Data>
```

```
    </Item>
  </Operation>
</Operations>
```

Step 4. The DMS performs preprocessing, such as converting the format of the command. The DMS may further determine the scheduled tasks, as a complex logic exists.

Step 5. The DMS establishes a DM management session with the user terminal (Device).

Step 6. The DMS queries the ringtone information and the configuration information of the ringtone of the user terminal.

Step 7. The user terminal returns a query result to the DMS.

Step 8. The DMS generates an MO for dispatching the relevant data for the user terminal, an MO for configuring the ringing tone. The DMS may further generate a scheduling MO for processing the ringing duration as a complex logic exists. The DMS sends the generated MO to the user terminal—the generated MO will be generally referred to as SoundMO hereinafter, and sends the download link and download command of the ringing tone to the user terminal via the MO. An example of the SoundMO is shown in FIG. 7.

In the FIG. 7, the ringing tone number, such as 601502000000001001, is stored on an ID node. This number corresponds to the number of the ring back tone configured.

The main node corresponding to the MO is as follows:

| | | <ContentType> | |
|---|---|---|---|
| Tree Node | Format | Minimum Access Right | Value |
| One | Chr | Get | Sound/Pic/ ... |

This table indicates the format of the content indicated by the ID.

Downloading the ringtone file may be implemented by executing a Replace command for the URL node in FIG. 7 to dispatch the download address of the ringtone file, and then executing an Exec command for the Download node to make the terminal download the ringtone from a content server.

The command of downloading the ringtone is as follows:

```
<Replace>
    <CmdID>1</CmdID>
    <Meta>
      <Format xmlns="syncml:metinf">chr</Format>
      <Type xmlns="syncml:metinf"> text/plain</Type>
    </Meta>
    <Item>
    <Target>
    <LocURI>./SoundMO/DL-
Install/S601502000000001001/Operations/Download/URL</LocURI>
    </Target>
        <Data>---URL of the ringtone file---</Data>
    </Item>
</Replace>
<Exec>
    <CmdID>2</CmdID>
    <Item>
    <Target>
    <LocURI>./SoundMO/DL-
Install/S601502000000001001/Operations/Download </LocURI>
        </Target>
        </Item>
</Exec>
```

For example, in this process, If it is indicated in Step 7 that this ringing tone is already stored in the user terminal, the process turns to Step 12. If it is indicated in Step 7 that this ringing tone is already configured as the active ringing tone by the user terminal, the process ends.

Step 9. The user terminal sends out a data downloading request according to the content server, so as to download the ringing tone from the download link. This step may also be implemented between Step 12 and Step 13.

Step 10. The content server returns the ringing tone in the download link to the user terminal.

Step 11. The user terminal returns an operation result to the DMS.

Step 12. The DMS sends an installation/configuration command to the user terminal.

The MO as shown in FIG. 7 executes an Exec command for an Install node when the download is completed, so as to accomplish the installation of the ringtone file. The installation means adding the ringtone file to the ringtone list in the terminal. The added ringtone may not necessarily be configured to be the active ringtone. A command, such as an Exec command, for operating a ringtone configuring node (Active node) is issued, so as to configure the ringtone to be the active ringtone. The command for installing and activating the ringtone is as follows:

```
<Sequence>
    <Exec>
    <CmdID>2</CmdID>
    <Item>
      <Target>
        <LocURI>./ SoundMO /
DL-Install/S601502000000001001/Operations/Install</LocURI>
      </Target>
    </Item>
        </Exec>
 <Exec>
<CmdID>3</CmdID>
<Item>
   <Target>
     <LocURI>./ SoundMO
/Configure/S601502000000001001/Operations/Active</LocURI>
    </Target>
</Item>
        </Exec>
  </Sequence>
```

Step 13. The user terminal configures the ringing tone according to the command.

Steps 14-16. The user terminal returns a configuration result to the network side.

A forth embodiment of present invention provides a scheme in which a ringing tone is sent via a DM mode directly. During the establishment of the call, the switching center sends a CONNECT instruction carrying the number of current ring back tone to the user device, so as to trigger a corresponding ringing tone. The present embodiment includes following steps.

Steps 1-10 are the same as the process of steps 1-10 mentioned in the first Embodiment.

Step 11. During the calling, a switching center connected with the CRBT server in the ring back tone platform queries the information of the ring back tone in the CRBT and obtains the number of the current ring back tone. The switching center may be a calling MSC or called MSC in a GSM network, a switch in a fixed network, or a Proxy server transmitting an Invite command.

Step 12. The number of the current ring back tone is carried in a CONNECT instruction as the CONNECT instruction is sent to the called user terminal.

In this process, the method of carrying the number of the current ring back tone is extending the CONNECT instruction sent by the switching center to the user terminal. The extended CONNECT instruction may be a CONNECT instruction in the intelligent network or may be the Invite command of Session Initiation Protocol (SIP).

The following is an embodiment of the extension of the Invite command of SIP. The extended part may be as follows:

The following is an example of the extended Invite command, where the SoundID is an extended message header.

INVITE sip:bob@biloxi.com SIP/2.0
Via: SIP/2.0/UDP pc33.atlanta.com; branch=z9hG4bKnashds8
Max-Forwards: 70
To: Bob<sip:bob@biloxi.com>
From: Alice<sip:alice@atlanta.com>;tag=1928301774
Call-ID: a84b4c76e66710
CSeq: 314159 INVITE
SoundID: 601502000000001001
Contact: <sip:alice@pc33.atlanta.com>
Content-Type: application/sdp
Content-Length: 142

Step 13. The called user terminal searches for the corresponding ringing tone in the terminal locally in accordance with the number in the received command. If the corresponding ringing tone exists, the terminal rings with the ringtone found for the user. Otherwise, the ringtone currently configured on the terminal is used for ringing.

Figure 9:
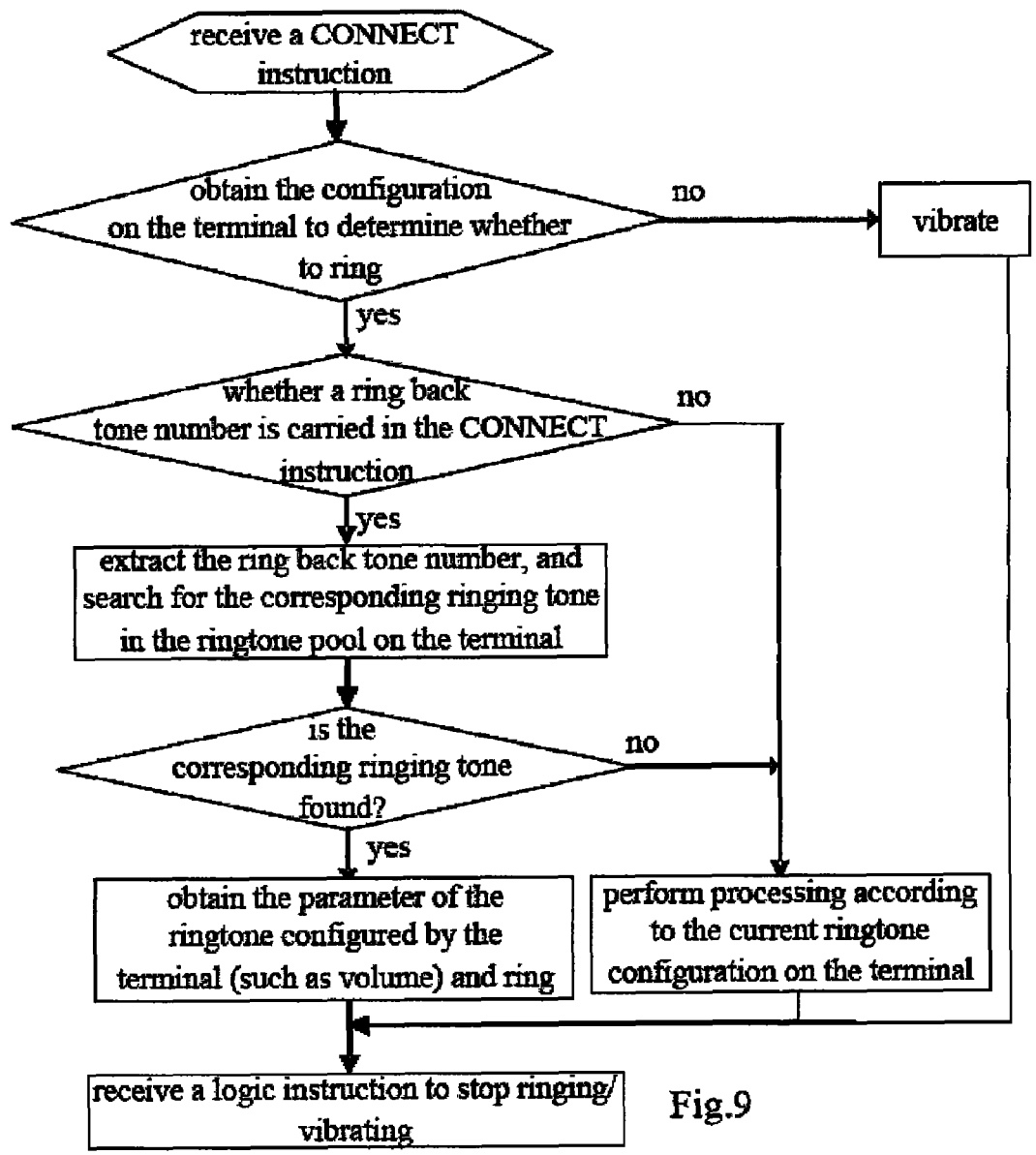
FIG. 9 is a logic diagram of the ringing on the user terminal according to a fourth embodiment of the invention.

In this process, the ringing logic of the user terminal is changed to some extent. The changed logic is as shown in FIG. 9.

When receiving the CONNECT instruction, the user terminal firstly obtains the configuration on the terminal to determine whether to ring. If yes, it determines whether a ring back tone number is carried in the CONNECT instruction. Otherwise, the user terminal vibrates.

If the CONNECT instruction carries a ring back tone number, this number is extracted, and the corresponding ringing tone is searched for locally. If the corresponding ringing tone is found, the parameter of the ringtone on the terminal, such as volume, is obtained, and the user terminal rings. Otherwise, the user terminal rings with the currently configured ringtone. If the CONNECT instruction does not carry a ring back tone number, the user terminal uses the currently configured ringtone on the user terminal for ringing directly.

It is required in the fourth Embodiment that the CONNECT instruction should be sent to the called user terminal after obtaining the data of the ring back tone from the CRBT. The fourth Embodiment may not be adopted for the ring back tone implementation scheme in which the CONNECT instruction is sent to the user terminal before the data of the ring back tone is obtained from the CRBT.

There is further provided a ring back tone platform. The interface between the ring back tone platform and the DMS is responsible for transmitting the relevant data of the ringing tone as well as the configuration command of the ringing tone, the relevant data of the ringing tone includes the ringing tone, the download link URL of the ringing tone etc. This interface may be implemented with DM Web Service Interface (DM WSI), or may use a private interface between the ring back tone platform and the DMS, such as customized RPC invoke.

The ring back tone platform according to the invention includes: a ring back tone data module, a ringtone management module, a ringing tone data dispatching module and a terminal ringing tone data module, the above modules are connected in sequence.

The ring back tone data module is adapted to store the ring back tone.

The ringtone management module is adapted to configure the ring back tone, and trigger the ringing tone data dispatching module when an instruction of downloading the ringing tone is received, as well as trigger a terminal ringing tone configuration module when an instruction of configuring the ringing tone of the terminal is received.

The ringing tone data dispatching module is adapted to search for the ringing tone corresponding to the currently configured ring back tone in the terminal ringing tone data module, and dispatch the relevant data of the ringing tone to the user terminal.

The ringing tone stored in the terminal ringing tone data module corresponds to the ring back tone stored in the ring back tone data module. The terminal ringing tone data module may also be arranged in a content server, where the content server is independent from the ring back tone platform.

Figure 10:
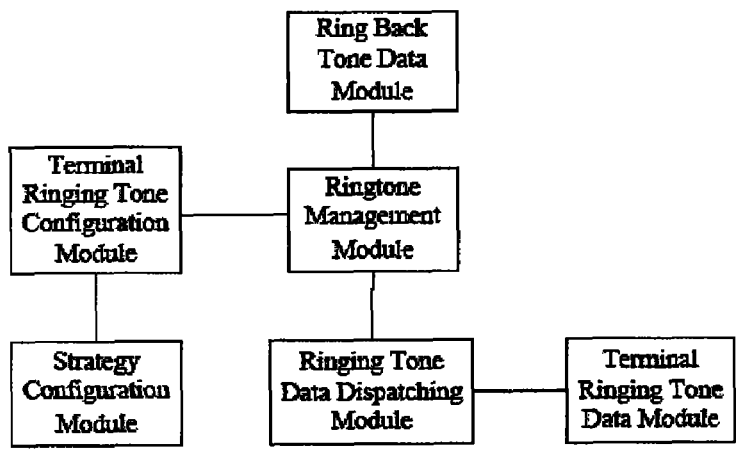
FIG. 10 is a schematic diagram showing the architecture of the ring back tone platform according to a fifth embodiment of the invention.

In a fifth embodiment of the present invention, provides a scheme for realizing the synchronization between the ringtone of the ring back tone and the ringing tone automatically, corresponding to the Mode 1 for sending the instruction by the network side in the above method, a terminal ringing tone configuration module connected with the ringtone management module is included, as shown in FIG. 10. Further, a strategy configuration module connected with the terminal ringing tone configuration module is included.

The terminal ringing tone configuration module is adapted to generate a ringtone configuration logic on the terminal according to the terminal ringing tone configuration strategy, and send configuration commands to the terminal. The terminal ringing tone configuration module may also send a delete command, the delete command carries the number of the terminal ringing tone corresponding to the currently configured ring back tone, to the terminal, when it is known that the ring back tone fails.

The strategy configuration module may be used by the user to configure a strategy, or by the system to configure a default strategy, the strategy is the condition for generating the ringtone configuration logic on the terminal by the terminal ringing tone configuration module.

Figure 11:
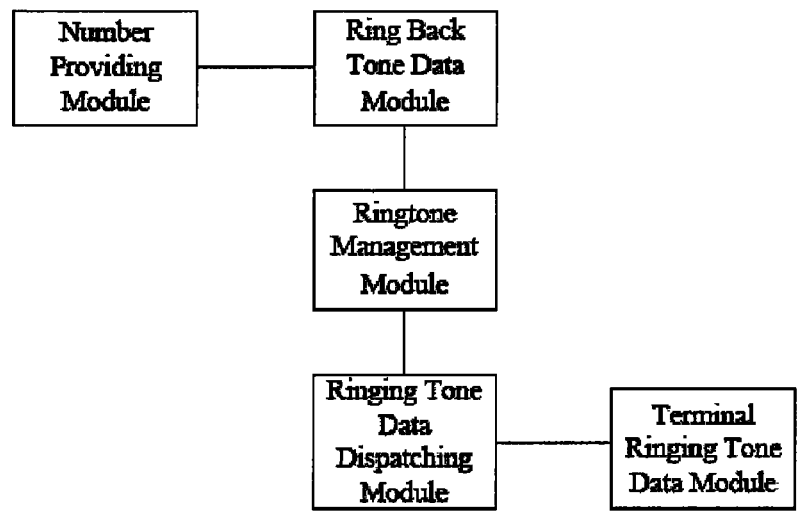
FIG. 11 is a schematic diagram showing the architecture of the ring back tone platform according to a sixth embodiment of the invention.

In a sixth embodiment of present invention, for automatically realizing the synchronization between the ringtone of the ring back tone and the ringing tone, a number providing module connected with the ring back tone data module is included corresponding to the Mode 2 for sending the instruction by the network in the above method, as shown in FIG. 11.

The number providing module is adapted to provide the switching center with the corresponding ring back tone number during the call connection.

There is further provided a user terminal according to an embodiment of the invention, the usr terminal includes a first MO saving module and an obtaining module connected with each other.

The first MO saving module is adapted to save the MO sent by the DMS and used for dispatching the relevant data of the ringing tone corresponding to the ring back tone.

The obtaining module is adapted to obtain the ringing tone in accordance with the relevant data sent by operating the MO saved in the first MO saving module by the network side.

Figure 12:
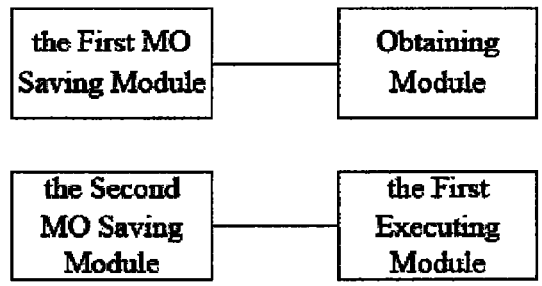
FIG. 12 is a schematic diagram showing the architecture of the user terminal according to a seventh embodiment of the invention.

In a seventh embodiment of present invention, for automatically realizing the synchronization between the ringtone of the ring back tone and the ringing tone, a second MO saving module and a first executing module connecting with each other are included corresponding to the Mode 1 for sending the instruction by the network side in the above method, as shown in FIG. 12.

The second MO saving module is adapted to save the MO for configuring the ringing tone sent by the network side, or is adapted to save the MO for configuring the ringing tone and a scheduling MO for processing the ringing duration sent by the network side.

The first executing module is adapted to operate the MO for configuring the ringing tone saved in the second MO saving module in accordance with the command sent by the network side, so as to accomplish the ringing tone configuration for the user. Optionally the first executing module is adapted to operate the MO for configuring the ringing tone saved in the second MO saving module in accordance with the command sent by the scheduling MO saved in the second MO saving module, so as to accomplish the ringing tone configuration for the user.

Figure 13:
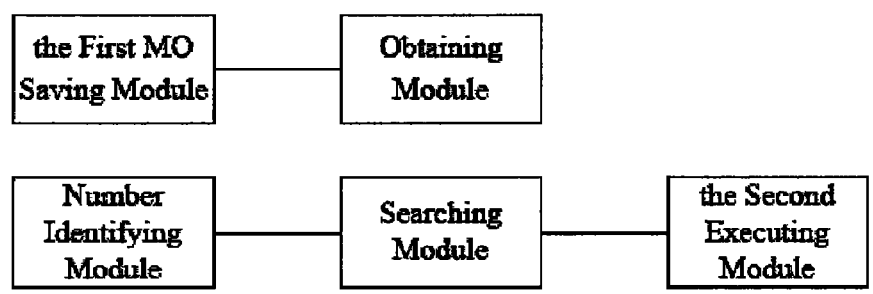
FIG. 13 is a schematic diagram showing the architecture of the user terminal according to an eighth embodiment of the invention.

In an eighth embodiment of present invention, for automatically realizing the synchronization between the ringtone of the ring back tone and the ringing tone, a number identifying module, a searching module and a second executing module connected in sequence are included corresponding to the Mode 2 for sending the instruction by the network side in the above method, as shown in FIG. 13.

The number identifying module is adapted to identify the number in the CONNECT instruction.

The searching module is adapted to search locally for the ringing tone corresponding to the number identified by the number identifying module.

The second executing module is adapted to play the ringing tone found by the searching module.

The method for obtaining the ringtone on the terminal according to the invention is not limited to dispatching the relevant data of the terminal ringing tone to the user terminal via the DM mode. Alternatively, the ringing tone and the ringtone configuration instruction may be sent with a multimedia message. The configuration instruction may be an AT instruction or an extended special instruction.

For example, when receiving the instruction of configuring a ring back tone to be a terminal ringing tone, the ring back tone platform generates a multimedia message, the content of the multimedia message is the ringing tone corresponding to the ring back tone. A special identifier is set in the multimedia message. Then the ring back tone platform interacts with the multimedia message service (MMS) server and sends the multimedia message to the user terminal. The user terminal identifies the special identifier carried in the multimedia message and learns that the ringtone carried in the multimedia message is used for ringing tone configuration. Then the ringtone carried in the multimedia message is extracted and saved. Further, in the present embodiment, it is also possible to realize the synchronization between the ringtone of the ring back tone and the ringing tone. For example, the ringtone configuration instruction is sent with a short message or a multimedia message, so as to accomplish the ringing tone configuration on the user terminal. Alternatively, during the calling, the number of the current ring back tone is carried in the CONNECT instruction, and then the corresponding ringing tone is identified and searched for by the user terminal.

A system for converting the ring back tone into the ringing tone according to an embodiment of the present invention, includes:

a network element on the network side, adapted to determine the relevant date of the ringing tone corresponding to the ring back tone configured and to dispatch the relevant data;

a user terminal, adapted to obtain the ringing tone in accordance with the relevant data dispatched by the network side; and a ring back tone platform on the network side, adapted to determine the relevant data of the ringing tone corresponding to the ring back tone configured, and forward the relevant data to the user terminal via the device management server (DMS). Specifically, the DMS dispatches the relevant data to the user terminal by sending to the user terminal a management object (MO) used for dispatching the relevant data, or by operating the MO used for dispatching the relevant data already available in the user terminal.

In the scheme provided in an embodiment of the invention, the ringing tone download server receives the result of the ring back tone configuration provided by the ring back tone platform, and provides the user terminal with the ringing tone corresponding to the result of the ring back tone configuration via a gateway. The user terminal configures the above ringing tone to be the ringing tone of the calling party in the result of the ring back tone configuration. In other words, the ring back tone platform notifies the ringing tone download server of the result of the ring back tone configuration, when the configuration of the ring back tone is completed according to the request of the user. The ringing tone download server provides the user terminal with the ringing tone corresponding to the result of the ring back tone configuration, when the result of the ring back tone configuration is received. The user terminal configures this ringing tone as the ringing tone of the calling party in the result of the ring back tone configuration.

Figure 14:
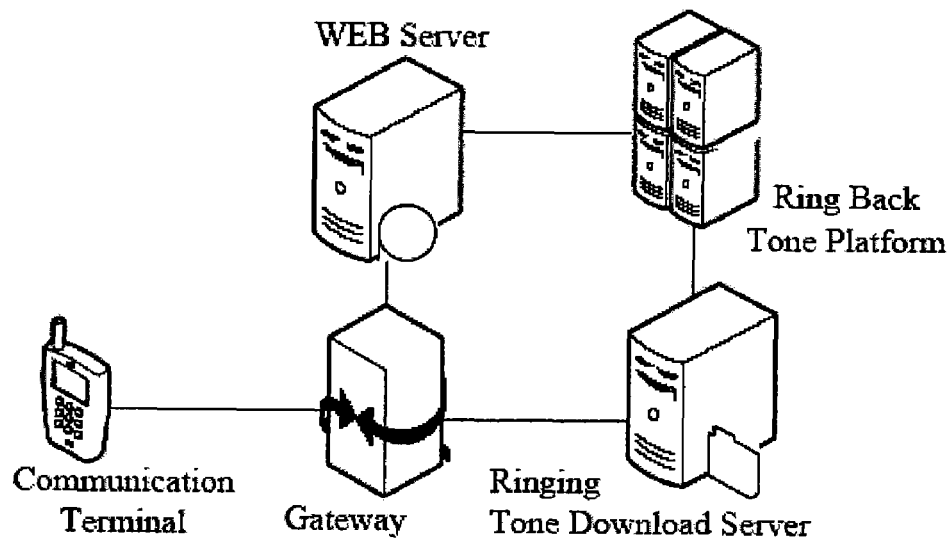
FIG. 14 is a schematic diagram showing the architecture of a system for configuring the ringing tone and the ring back tone according to an embodiment of the invention.

When the download of the ringing tone is triggered by the configuration of the ring back tone, the system used for configuring the ringing tone and the ring back tone includes the ring back tone platform, the ringing tone download server and the user terminal. The relation of connection is as shown in FIG. 14. The ring back tone platform is adapted to configure the ring back tone according to the request of the user, and notify the ringing tone download server of the result of the ring back tone configuration. The ringing tone download server is adapted to receive the result of the ring back tone configuration, and provide the user terminal with the ringing tone corresponding to the result of the ring back tone configuration. The user terminal is adapted to receive the ringing tone, and configure the received ringing tone to be the ringing tone of the calling party in the result of the ring back tone configuration in accordance with the operation of the user. A gateway may be further included between the user terminal and the ringing tone download server. The gateway is adapted to transmit the information exchanged between the user terminal and the ringing tone download server. The system for configuring the ringing tone and the ring back tone may further include a WEB server. The user may log on the ring back tone platform via the WEB server with peripheral equipment, and request the ring back tone platform to configure the ring back tone. Alternatively, the user may also log on the ring back tone platform with other methods. For example, the user may log on the ring back tone platform with the user terminal directly.

Figure 15:
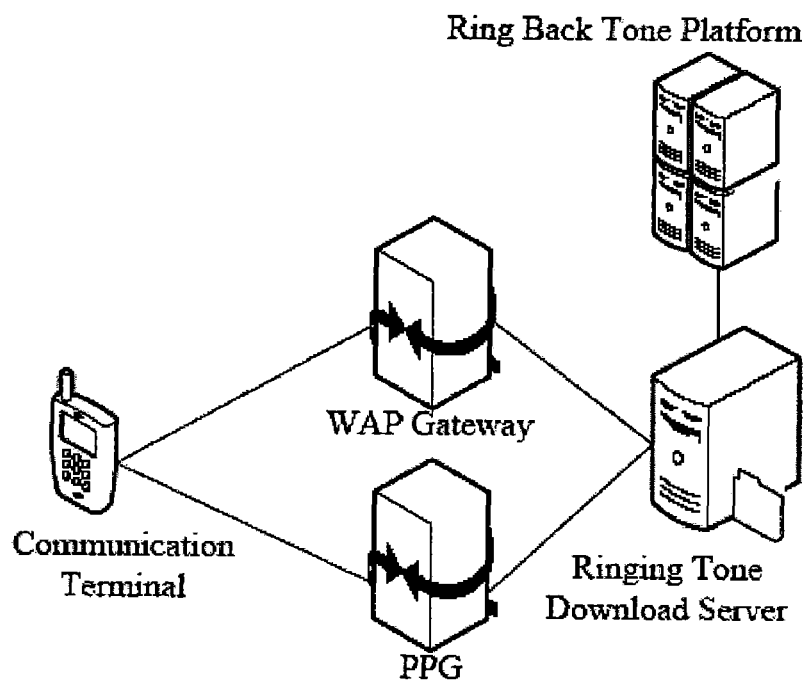
FIG. 15 is a first schematic diagram showing the architecture of a system for configuring the ringing tone and the ring back tone according to an embodiment of the invention.

FIG. 15 is a first schematic diagram showing the architecture of a system for configuring the ringing tone and the ring back tone according to an embodiment of the invention. As shown in FIG. 15, the gateway shown in FIG. 14 may include a Push Proxy Gateway (PPG) and a WAP gateway. At this point, the ringing tone download server is adapted to provide the PPG with the ringing tone information, and provide the WAP gateway with the ringing tone according to the ringing tone downloading request from the WAP gateway. The PPG is adapted to construct a Push message according to the ringing tone information from the ringing tone download server, and send the Push message including the ringing tone download information to the user terminal. The WAP gateway is adapted to transmit the ringing tone and the ringing tone downloading request exchanged between the user terminal and the ringing tone download server. The user terminal is connected to the WAP gateway with the Push message from the PPG, sends a ringing tone downloading request to the ringing tone download server, and downloads the ringing tone provided by the ringing tone download server via the WAP gateway.

The PPG needs to send the Push message to the user terminal according to the ringing tone information provided by the ringing tone download server. However, if the message processing unit of the user terminal is not turned on, the user terminal may not receive the Push message, which may lead to a failure. Therefore, an embodiment of the invention puts forward the following solution. When the message processing unit of the user terminal is turned on, an online message is sent to the WAP gateway; when the message processing unit of the user terminal is turned off, an offline message is sent to the WAP gateway. The ID of the message processing unit is carried in the online message or the offline message. The ID of the user terminal may be adopted as the ID of the message processing unit. Thus, an online list of the message processing unit of each user terminal is maintained in the WAP gateway, and the ID of the online message processing unit is contained in this online list. When an online message sent by the message processing unit of a user terminal is received, the ID of the message processing unit of this user terminal is added to the online list. When an offline message sent by the message processing unit of a user terminal is received, the ID of the message processing unit of this user terminal is deleted from the online list. The ringing tone download server inquires of the WAP gateway about whether the message processing unit of a corresponding user terminal is online. If yes, the ringing tone download server provides the PPG with the ringing tone information. Otherwise, the ringing tone information is buffered in a message queue by the ringing tone download server. When it is determined that the message processing unit of the user terminal is online, the ringing tone information is provided for the PPG. The method used by the ringing tone download server to learn that the message processing unit of the corresponding user terminal is online includes: inquiring of the WAP gateway periodically about the online list, or requesting the WAP gateway to send a notification to the ringing tone download server when the message processing unit of the corresponding user terminal is online.

To prevent the situation that the message processing unit is accidentally turned off without sending the offline message to the WAP gateway because of the accidental turning off of the user terminal from occurring, a valid time threshold may be configured in the WAP gateway. When the online time length of the message processing unit of a user terminal is larger than the valid time threshold, it may be deemed that the message processing unit of this user terminal is already offline, and the ID of the message processing unit of this user terminal is deleted from the online list. When the WAP gateway receives the online message of the message processing unit of this user terminal again, the ID of the message processing unit is added to the online list.

Figure 16:
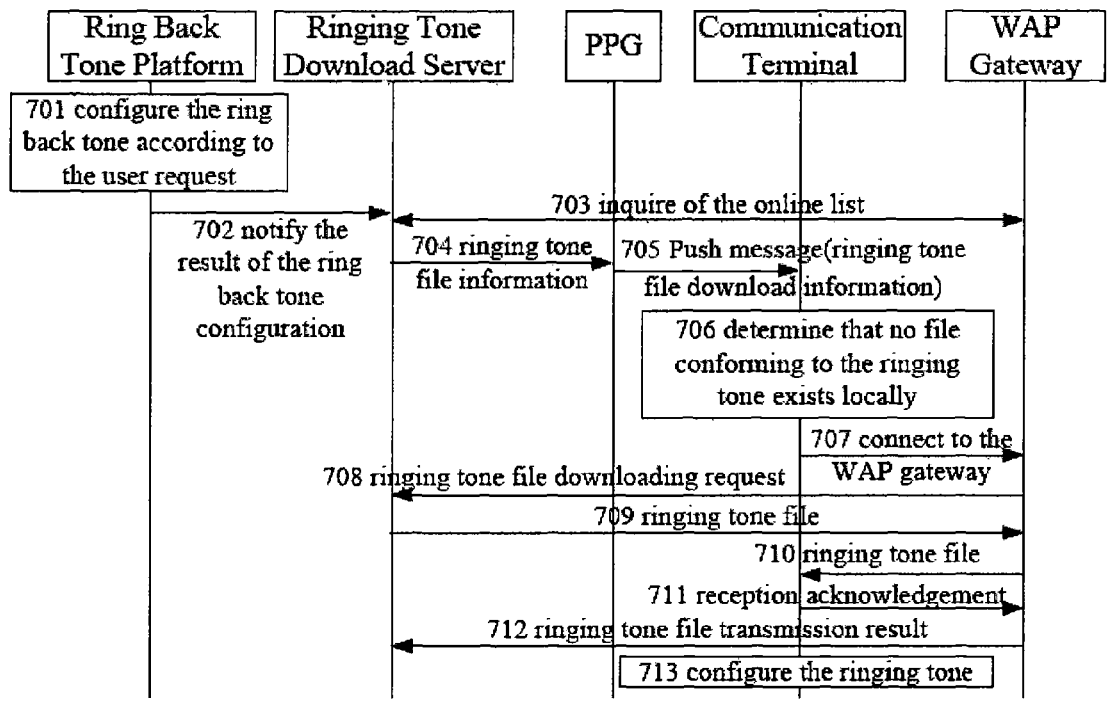
FIG. 16 is a diagram showing a first flow chart for configuring the ringing tone and the ring back tone according to an embodiment of the invention.

FIG. 16 is a diagram showing a first flow chart for configuring the ringing tone and the ring back tone according to an embodiment of the invention. As shown in FIG. 16, in the present embodiment, the process for configuring the ringing tone and the ring back tone includes the following steps:

Step 701: The ring back tone platform configures the ring back tone of the user terminal according to the request of the user. The user may log on the ring back tone platform via a WEB server with peripheral equipment, and request the ring back tone platform to configure the ring back tone. Alternatively, the user may log on the ring back tone platform with other methods. For example, the user may log on the ring back tone platform with the user terminal directly.

Step 702: When the ring back tone platform completes the configuration of the ring back tone, it notifies the ringing tone download server of the result of the ring back tone configuration. The result of the ring back tone configuration may include the user information and the ring back tone information at least. When the user sets an audio file to be the ring back tone, the result of the ring back tone configuration may also include the user information and the coincidence relation between the ring back tone and the calling party.

Step 703: The ringing tone download server receives the result of the ring back tone configuration, determines the ringing tone corresponding to the result of the ring back tone configuration, and then inquires of the WAP gateway about the ID of the message processing unit of the user terminal contained in the online list, so as to determine whether the message processing unit of the user terminal corresponding to the user information is online. If the message processing unit of the user terminal is online, proceed to execute Step 704, otherwise, the ringing tone information is buffered in the message queue. The method used by the ringing tone download server to learn that the message processing unit of the corresponding user terminal is online includes: inquiring of the WAP gateway periodically about the online list, or requesting the WAP gateway to send a notification to the ringing tone download server when the message processing unit of the corresponding user terminal is online.

Step 704: The ringing tone download server provides the PPG with the ringing tone information corresponding to the result of the ring back tone configuration.

Step 705: After receiving the ringing tone information, the PPG constructs a Push message according to the ringing tone information, and then sends the Push message including the ringing tone download information to the user terminal.

Step 706: When receiving the Push message, the user terminal searches in the files saved locally to determine whether a file conforming to the ringing tone exists. If yes, execute Step 713 directly; otherwise, proceed to execute Step 707. The file conforming to the ringing tone refers to the file stored locally and whose file format conforms to the format of the ringing tone. Accordingly, the file not conforming to the ringing tone refers to the file not stored locally, or whose file format does not conform to the format of the ringing tone.

Before searching for the file conforming to the ringing tone, the user terminal may first prompt an operation interface to the user to ask whether the user wants to download the ringing tone. If the confirmation of the user is received, proceed to execute Step 706; otherwise, the present flow ends directly, i.e. no operation is performed.

Step 707-Step 708: The user terminal connects to the WAP gateway according to the received Push message, and sends a ringing tone downloading request to the WAP gateway. When the WAP gateway receives the ringing tone downloading request, it sends the ringing tone downloading request to the ringing tone download server, and requests to download the corresponding ringing tone.

Step 709: After receiving the ringing tone downloading request, the ringing tone download server provides the WAP gateway with the ringing tone corresponding to the result of the ring back tone configuration.

Step 710: After receiving the ringing tone, the WAP gateway provides the user terminal with the ringing tone corresponding to the result of the ring back tone configuration.

Step 711: After receiving the ringing tone, the user terminal sends a reception acknowledgement to the WAP gateway to notify the WAP gateway that the ringing tone is received successfully.

Step 712: After receiving the reception acknowledgement, the WAP gateway sends the result of the ringing tone configuration to the ringing tone download server, so as to notify the ringing tone download server to finish the present ringing tone download.

Step 713: After receiving the ringing tone, the user terminal may configure this ringing tone to be the ringing tone of the calling party in the result of the ring back tone configuration according to the operation of the user.

There is no evident temporal sequence when executing Step 711-Step 712 and Step 713. Step 711-Step 712 and Step 713 may be executed at the same time; or it is possible to execute Step 711-Step 712 first, and then execute Step 713; or it is also possible to execute Step 713 first, and then execute Step 711-Step 712.

It is also possible to substitute the following steps for the aforementioned Step 703 to Step 713, i.e. the Open Mobile Alliance (OMA) Download mode may be adopted to dispatch the relevant data of the ringing tone corresponding to the result of the ring back tone configuration. The specific steps are as follows.

Step 1. The ringing tone download server receives the result of the ring back tone configuration, determines the ringing tone corresponding to the result of the ring back tone configuration, and then pushes the Download Descriptor (DD) file of the ringing tone to the user terminal. This file is adapted to describe the information of the ringtone file to be downloaded. The information mainly includes: provider information, file size, installation parameter, and installation notification message etc. The push may be implemented with the WAP Push mechanism or the MMS mechanism. When the WAP Push is adopted, the ApplicationID should use x-oma-application:dlota.ua, where the binary form is 0x11. An example of the DD file is as follows:

```
<media xmlns="urn:oma:xml:dl:dd:2.0" DDVersion="2.0">
  <product>
    <mediaObject>
      <meta>
        <installNotifyURI>http://download.example.com/
            bell.mp3?id=DeviceBell</installNotifyURI>
      </meta>
      <size>43120</size>
      <type>audio/mpeg</type>
      <objectID>cid:mp3@example.com</objectID>
      <objectURI>
        <server>http://download.example.com/bell.mp3</server>
      </objectURI>
    </mediaObject>
  </product>
</media>
```

Step 2. The user terminal analyses the received DD file, determines whether the capability of the terminal satisfies the requirements for download, such as whether the memory is enough, and downloads the ringtone file according to the address information in the ObjectURI element in the DD file. The download is implemented by sending an HTTP request to the address indicated by the ObjectURI.

Step 3. When the download is finished, the user terminal performs the ringing tone configuration according to the instruction of the installNotifyURI in the DD file. If the DD also includes an installParam element, the ringing tone configuration is performed according to the instruction of the installation parameters in the installParam element.

Step 4. When the ringing tone configuration is finished, the user terminal reports the information of the configuration result to a designated server according to the address information in the installNotifyURI in the DD file. The HTTP information is used for the reporting.

An embodiment of the invention further provides a method for converting the ringing tone into the ring back tone, the method includes the following main steps.

When the ringing tone configuration is finished, the user terminal reports the result of the ringing tone configuration to the ring back tone platform. The ring back tone platform classifies the ring back tone corresponding to the ringing tone into the ring back tone pool of this user terminal according to the result of the ringing tone configuration.

An embodiment of the invention further provides a system for converting the ringing tone into the ring back tone, the system includes:

a user terminal, adapted to configure the ringing tone and report the result of the ringing tone configuration;

a ring back tone platform, adapted to classify the ring back tone corresponding to the ringing tone into the ring back tone pool of this user terminal according to the result of the ringing tone configuration reported by the user terminal.

Further, the user terminal finishes the ringing tone configuration according to the operation of the user, and requests, according to the operation of the user, the ring back tone platform to configure the ring back tone based on the result of the ringing tone configuration. The ring back tone platform configures the ring back tone of the user terminal according to the request received.

When the configuration of the ring back tone is triggered by the configuration of the ringing tone, the system for configuring the ringing tone and the ring back tone may include a user terminal and a ring back tone platform. The relation of connection is as shown in FIG. 14, where the user terminal is adapted to configure the ringing tone according to the operation of the user, and request, according to the operation of the user, the ring back tone platform to configure the ring back tone based on the result of the ringing tone configuration. The ring back tone platform is adapted to configure the ring back tone of the user terminal according to the received request.

When the configuration of the ring back tone is triggered by the configuration of the ringing tone, the system for configuring the ringing tone and the ring back tone may include a user terminal, a ring back tone platform and a ringing tone download server. The relation of connection is as shown in FIG. 14, where the user terminal is adapted to configure the ringing tone according to the operation of the user, such as configuring the ringing tone to be the ringing tone for a corresponding contact user in the address book, and request, according to the operation of the user, the ring back tone platform to configure the ring back tone based on the result of the ringing tone configuration. The ring back tone platform is adapted to configure the ring back tone of the user terminal according to the received request. The ringing tone download server is further adapted to transmit the information exchanged between the user terminal and the ring back tone platform. The ringing tone download server is adapted to provide the user terminal with the ringing tone. A gateway may be configured between the user terminal and the ringing tone download server, for transmitting the information exchanged between the user terminal and the ringing tone download server.

When the download of the ringing tone is not involved, the system for configuring the ringing tone and the ring back tone may include a user terminal, a gateway, a WEB server and a ring back tone platform. The relation of connection is as shown in FIG. 14, where the user terminal is adapted to configure the ringing tone according to the operation of the user, and request, according to the operation of the user, the ring back tone platform to configure the ring back tone based on the result of the ringing tone configuration. The ring back tone platform is adapted to configure the ring back tone of the user terminal according to the received request. The gateway and the WEB server are adapted to transmit the information exchanged between the user terminal and the ring back tone platform.

When the user terminal requests the ring back tone platform to configure the ring back tone based on the result of the ringing tone configuration, the request may be sent to the ring back tone platform via the ringing tone download server. When the system includes a gateway, the request may also be sent to the ring back tone platform via the gateway and the ringing tone download server. When the system includes the gateway and the WEB server, the request may also be sent to the ring back tone platform via the gateway and the WEB server.

The ring back tone platform is adapted to return the result of the ring back tone configuration to the user terminal. The result of the ring back tone configuration may be sent to the user terminal via the ringing tone download server. When the system includes a gateway, the result of the ring back tone configuration may also be sent to the user terminal via the ringing tone download server and the gateway. When the system includes the gateway and the WEB server, the result of the ring back tone configuration may also be sent to the user terminal via the WEB server and the gateway.

Figure 17:
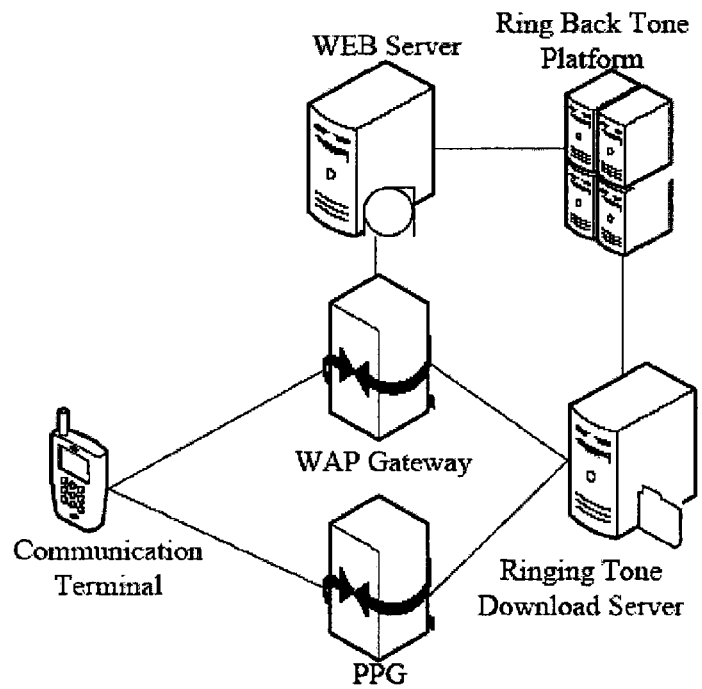
FIG. 17 is a second schematic diagram showing the architecture of a system for configuring the ringing tone and the ring back tone according to an embodiment of the invention.

FIG. 17 is a second schematic diagram showing the architecture of a system for configuring the ringing tone and the ring back tone according to an embodiment of the invention. As shown in FIG. 17, the gateway shown in the FIG. 14 may include a PPG and a WAP gateway. At this point, the ringing tone download server is adapted to provide the PPG with the ringing tone information, and provide the WAP gateway with the ringing tone according to the ringing tone downloading request from the WAP gateway. The PPG is adapted to construct a Push message according to the ringing tone information from the ringing tone download server, and send the Push message including the ringing tone download information to the user terminal. The user terminal is connected to the WAP gateway with the Push message from the PPG, sends a ringing tone downloading request to the ringing tone download server via the WAP gateway, and downloads the ringing tone provided by the ringing tone download server via the WAP gateway.

When the ring back tone platform returns the result of the ring back tone configuration to the user terminal via the ringing tone download server and the PPG, the ringing tone download server is further adapted to provide the PPG with the result of the ring back tone configuration. The PPG is further adapted to construct the Push message according to the result of the ring back tone configuration from the ringing tone download server, and send the Push message containing the result of the ring back tone configuration to the user terminal. To prevent the user terminal from mixing up the original Push message and the Push message containing the result of the ring back tone configuration, the Push message may be received via a separately configured port, or may be received via the original port, however, the information which can embody the function of this Push message should be carried in this Push message.

The PPG needs to send the Push message to the user terminal according to the result of the ring back tone configuration provided by the ringing tone download server. However, if the message processing unit of the user terminal is not turned on, the user terminal may not receive the Push message. Therefore, an embodiment of the invention puts forward the following solution. When the message processing unit of the user terminal is turned on, an online message is sent to the WAP gateway; when the message processing unit of the user terminal is turned off, an offline message is sent to the WAP gateway. The ID of the message processing unit is carried in the online message or the offline message. The ID of the user terminal may be adopted as the ID of the message processing unit. Thus, an online list of the message processing unit of each user terminal is maintained in the WAP gateway, and the ID of the online message processing unit is contained in this online list. When an online message sent by the message processing unit of a user terminal is received, the ID of the message processing unit of this user terminal is added to the online list. When an offline message sent by the message processing unit of a user terminal is received, the ID of the message processing unit of this user terminal is deleted from the online list. Before providing the PPG with the result of the ring back tone configuration, the ringing tone download server inquires of the WAP gateway about whether the message processing unit of the corresponding user terminal is online. If yes, the ringing tone download server provides the PPG with the result of the ring back tone configuration. Otherwise, the result of the ring back tone configuration is buffered in a message queue by the ringing tone download server. When it is determined that the message processing unit of the user terminal is online, the result of the ring back tone configuration is provided for the PPG. The method used by the ringing tone download server to learn that the message processing unit of the corresponding user terminal is online includes: inquiring of the WAP gateway periodically about the online list, or requesting the WAP gateway to send a notification to the ringing tone download server when the message processing unit of the corresponding user terminal is online.

To prevent the situation that the message processing unit is accidentally turned off without sending the offline message to the WAP gateway because of the accidental turning off of the user terminal from occurring, a valid time threshold may be configured in the WAP gateway. When the online time length of the message processing unit of a user terminal is larger than the valid time threshold, it may be deemed that the message processing unit of this user terminal is already offline, and the ID of the message processing unit of this user terminal is deleted from the online list. When the WAP gateway receives the online message of the message processing unit of this user terminal again, the ID of the message processing unit is added to the online list.

Figure 18:
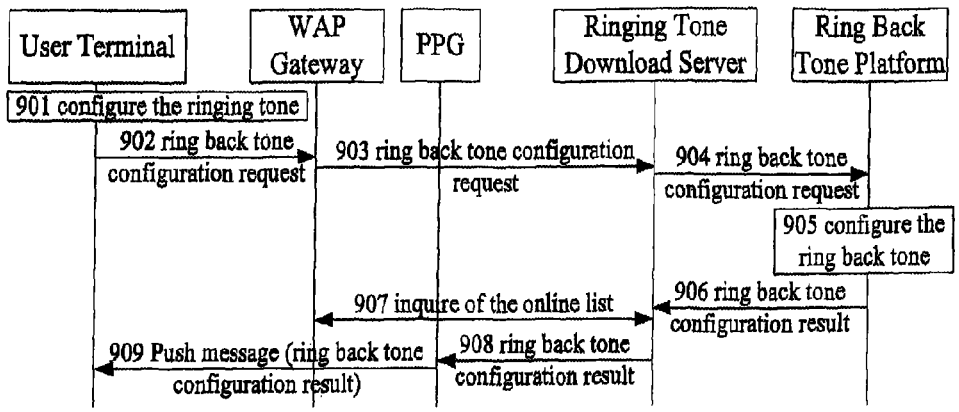
FIG. 18 is a diagram showing a second flow chart for configuring the ringing tone and the ring back tone according to an embodiment of the invention.

FIG. 18 is a diagram showing a second flow chart for configuring the ringing tone and the ring back tone according to an embodiment of the invention. As shown in FIG. 18, in the present embodiment, the process for configuring the ringing tone and the ring back tone includes the following steps:

Step 901: The user terminal configures the ringing tone according to the operation of the user. For example, the user terminal configures the ringing tone to be the ringing tone for a corresponding contact user in the address book.

Before Step 901, the user terminal may download the corresponding ringing tone by interacting with the ringing tone download server. If the corresponding ringing tone is already stored in the user terminal, the user terminal may operate the ringing tone according to the operation of the user directly.

Step 902: According to the operation of the user, the user terminal sends a ring back tone configuration request to the WAP gateway, for requesting the ring back tone platform to configure the ring back tone in accordance with the result of the ringing tone configuration. The ring back tone configuration request carries at least the file name of the ringing tone configured by the user terminal.

Before sending the ring back tone configuration request to the WAP gateway, the user terminal may first prompt an operation interface to the user to ask whether the user wants to configure the ring back tone. If the confirmation operation of the user is received, execute Step 706; otherwise, the present flow ends directly, i.e. no operation is performed.

Step 903-Step 904: After receiving the ring back tone configuration request, the WAP gateway sends the ring back tone configuration request to the ringing tone download server. The ringing tone download server sends the ring back tone configuration request to the ring back tone platform after receiving the ring back tone configuration request.

Step 905: After receiving the ring back tone configuration request, the ring back tone platform configures the ring back tone of the user terminal according to this ring back tone configuration request.

The ring back tone platform extracts the file name of the ringing tone from the ringing tone configuration request, and then searches the ring back tone data base for the ring back tone whose name is the same as that of this ringing tone. The ring back tone platform classifies the relevant information of this ring back tone into the ring back tone pool of the user terminal. After that, the ring back tone configuration may be performed according to the method as described in the prior art.

Alternatively, after extracting the file name of the ringing tone from the ringing tone configuration request, when the ring back tone platform determines that no relevant information of the ring back tone, whose name is the same as that of this ringing tone, exists in the ring back tone pool of the user terminal, the ring back tone platform searches the ring back tone data base for the ringing tone whose name is the same as that of the ringing tone. After that, the ring back tone configuration may be performed according to the method as described in the prior art.

Step 906: When the ring back tone configuration is finished, the ring back tone platform sends the result of the ring back tone configuration to the ringing tone download server.

Step 907: After receiving the result of the ring back tone configuration, the ringing tone download server inquires of the WAP gateway about the ID of the message processing unit of the user terminal contained in the online list, and determines whether the message processing unit of the user terminal corresponding to the user information is online. If yes, proceed to execute Step 908; otherwise, the ringing tone information is buffered in the message queue. When it is determined that the message processing unit of the user terminal is online, execute Step 908. The method used by the ringing tone download server to learn that the message processing unit of the corresponding user terminal is online includes: inquiring of the WAP gateway periodically about the online list, or requesting the WAP gateway to send a notification to the ringing tone download server when the message processing unit of the corresponding user terminal is online.

Step 908: The ringing tone download server provides the PPG with the result of the ring back tone configuration.

Step 909: After receiving the result of the ring back tone configuration, the PPG constructs a Push message according to the result of the ring back tone configuration, and then sends the Push message containing the result of the ring back tone configuration to the user terminal.

It is also possible to substitute the following steps for the aforementioned Step 902 to Step 904, i.e. the user terminal may also report the result of the ringing tone configuration via a short message. The specific steps are as follows: the user terminal sends the result of the ringing tone configuration to the Short Message Center; and the Short Message Center sends the configuration result to the ring back tone platform.

It is also possible to substitute the following steps for the aforementioned Step 902 to Step 904, i.e. the user terminal may also report the result of the ringing tone configuration via a SIP message. The specific steps are as follows: the user terminal sends a SIP message to the ring back tone platform, and the SIP message carries the result of the ringing tone configuration.

Figure 19:
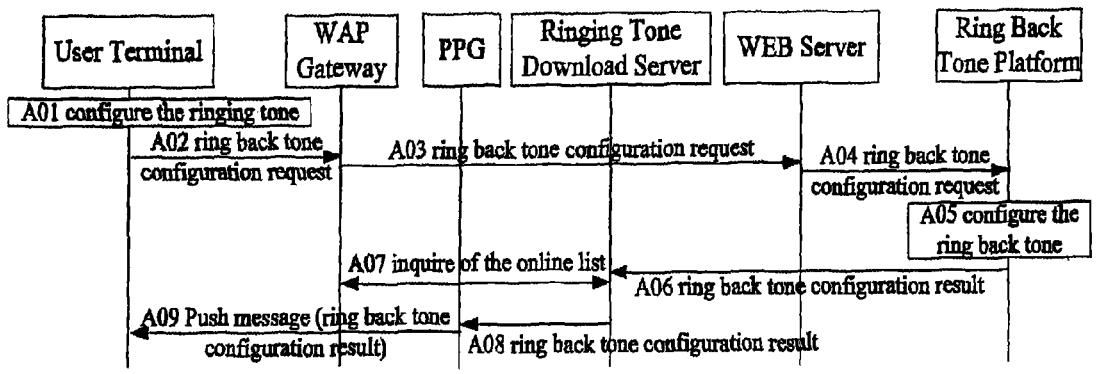
FIG. 19 is a diagram showing a third flow chart for configuring the ringing tone and the ring back tone according to an embodiment of the invention.

FIG. 19 is a diagram showing a third flow chart for configuring the ringing tone and the ring back tone according to an embodiment of the invention. As shown in FIG. 19, in the present embodiment, the process for configuring the ringing tone and the ring back tone includes the following steps:

Step A01: The user terminal configures the ringing tone according to the operation of the user. For example, the user terminal configures the ringing tone to be the ringing tone for a corresponding contact user in the address book.

Before Step A01, the user terminal may download the corresponding ringing tone by interacting with the ringing tone download server. If the corresponding ringing tone is already stored in the user terminal, the user terminal may operate the ringing tone according to the operation of the user directly.

Step A02: According to the operation of the user, the user terminal sends a ring back tone configuration request to the WAP gateway, for requesting the ring back tone platform to configure the ring back tone in accordance with the result of the ringing tone configuration.

Before sending the ring back tone configuration request to the WAP gateway, the user terminal may first prompt an operation interface to the user to ask whether the user wants to configure the ring back tone. If the confirmation operation of the user is received, execute Step 706; otherwise, the present flow ends directly, i.e. no operation is performed.

Step A03-Step A04: After receiving the ring back tone configuration request, the WAP gateway sends the ring back tone configuration request to the WEB server. The WEB server sends the ring back tone configuration request to the ring back tone platform after receiving the ring back tone configuration request.

Step A05: After receiving the ring back tone configuration request, the ring back tone platform configures the ring back tone of the user terminal according to this ring back tone configuration request.

Step A06: When the ring back tone configuration is finished, the ring back tone platform sends the result of the ring back tone configuration to the ringing tone download server.

Step A07: After receiving the result of the ring back tone configuration, the ringing tone download server inquires of the WAP gateway about the ID of the message processing unit of the user terminal contained in the online list, and determines whether the message processing unit of the user terminal corresponding to the user information is online. If yes, proceed to execute Step A08; otherwise, the ringing tone information is buffered in the message queue. When it is determined that the message processing unit of the user terminal is online, execute Step A08. The method used by the ringing tone download server to learn that the message processing unit of the corresponding user terminal is online includes: inquiring of the WAP gateway periodically about the online list, or requesting the WAP gateway to send a notification to the ringing tone download server when the message processing unit of the corresponding user terminal is online.

Step A08: The ringing tone download server provides the PPG with the result of the ring back tone configuration.

Step A09: After receiving the result of the ring back tone configuration, the PPG constructs a Push message according to the result of the ring back tone configuration, and then sends the Push message containing the result of the ring back tone configuration to the user terminal.

Figure 20:
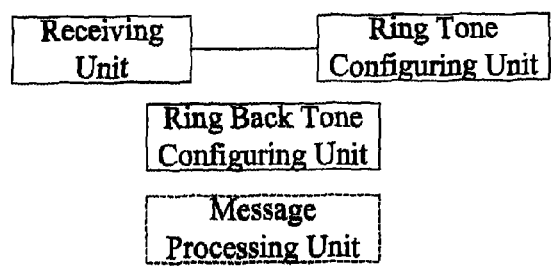
FIG. 20 is a schematic diagram showing the architecture of the communication terminal according to an embodiment of the invention.

The structure of the user terminal provided by the embodiments of the present invention is as shown in FIG. 20. It can be seen from the above description that the user terminal may include: a receiving unit and a ringing tone configuring unit. The receiving unit is adapted to receive the ringing tone sent by the ringing tone download server according to the result of the ring back tone configuration, and the ringing tone configuring unit is adapted to configure the received ringing tone to be the ringing tone. Alternatively, the user terminal may include a ring back tone configuring unit, adapted to configure the ringing tone, and request the ring back tone platform to configure the ring back tone of the user terminal according to the result of the ringing tone configuration. Alternatively, the user terminal may include the combination of the two above described structures. The user terminal may further include a message processing unit, adapted to send the online message when the message processing unit is turned on, and send the offline message when the message processing unit is turned off. The online message or the offline message carries the ID of the message processing unit.

Figure 21:
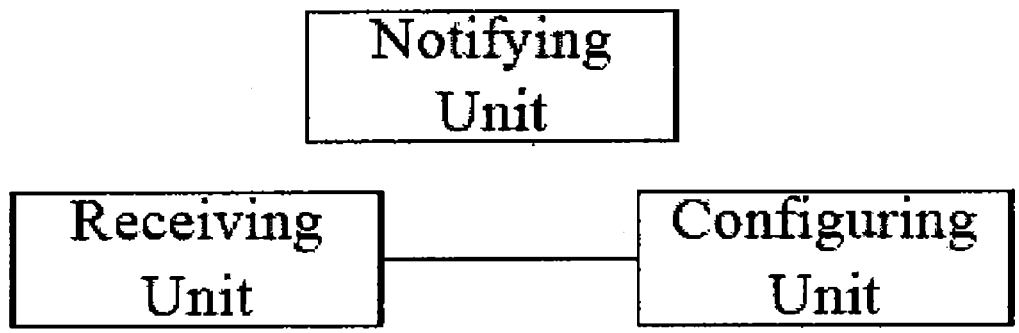
FIG. 21 is a schematic diagram showing the architecture of the ring back tone platform according to an embodiment of the invention.

The architecture of the ring back tone platform provided by the embodiments of the invention is as shown in FIG. 21. The ring back tone platform includes a notifying unit, adapted to notify the ringing tone download server of the result of the ring back tone configuration after the ring back tone configuration is completed. Alternatively, the ring back tone platform may include a receiving unit and a configuring unit. The receiving unit is adapted to receive the result of the ringing tone configuration from the ringing tone download server or the WEB server; the configuring unit is adapted to configure the ring back tone of the user terminal according to the result of the ringing tone configuration. Alternatively, the ring back tone platform may include the combination of the above described structures.

Figure 22:
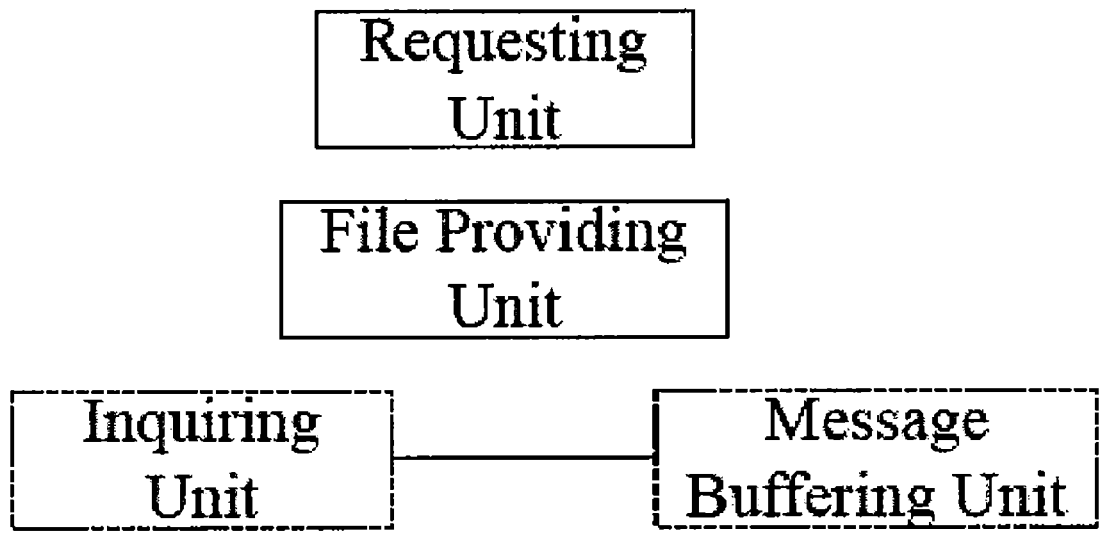
FIG. 22 is a schematic diagram showing the architecture of the ringing tone download server according to an embodiment of the invention.

The ringing tone download server provided by the embodiments of the invention is as shown in FIG. 22. The ringing tone download server includes: a requesting unit, adapted to send the ring back tone configuration request from the user terminal to the ring back tone platform. Alternatively, the ringing tone download server may include: a file providing unit, adapted to provide, according to the notification from the ring back tone platform, the user terminal with the ringing tone corresponding to the result of the ring back tone configuration. Alternatively, the ringing tone download server may include the combination of the above described structures. The ringing tone download server may further include an inquiring unit, adapted to inquiring about the online list maintained by the WAP gateway, and determine whether the message processing unit of the user terminal is online. The inquiring unit may further include a sending unit, adapted to send a notification to a message buffering unit further included in the ringing tone download server, when it is determined that the message processing unit of the user terminal is offline. The message buffering unit is adapted to buffer the result of the ring back tone configuration according to the received notification.

In the solution provided by the embodiments of the present invention, the downloading and configuring of the ringing tone may be triggered by the ring back tone configuration, or the configuring of the ring back tone may be triggered by the ringing tone configuration, so that relevance exists between the ring back tone configuration and the ringing tone configuration. When a user wants to configure the ringing tone and the ring back tone, which are the same, for a contact user or a contact group, it is not required to initiate and perform configuration separately as in the prior art. With the cooperation between the user terminal and the network elements, the configuration of the ringing tone and the ring back tone may be accomplished simultaneously, which facilitates the usage for the user, increases the satisfaction of the user for the service, and is beneficial for the popularization and application of the ring back tone service and the ringing tone download service.

Further, when it is required to send the Push message to the user terminal via the PPG, an online list of the message processing unit of each user terminal is maintained in the WAP gateway. When the ringing tone download server determines that the message processing unit of the user terminal is online, the PPG is instructed to construct the Push message, so as to avoid the situation that the user terminal cannot receive the Push message because the message processing unit is turned off, and the relevant processing fails.

The solutions provided by the embodiments of the present invention are not limited to the communication network. Instead, they may be suitable for the mobile communication network, or may be suitable for the fixed communication network.

To sum up, in the solutions provided by the embodiments of the invention, the relevant data of the ringing tone corresponding to the configured ring back tone is determined via the ring back tone platform, and dispatched to the user terminal. The user terminal obtains the ringing tone according to the relevant data. Thus, the ring back tone is converted into the ringing tone.

Further, the solutions in the embodiments of the invention provide a method of dispatching the relevant data via the DMS, and a method of dispatching the relevant data via the ringing tone download server.

Further, in the solutions provided by the embodiments of the invention, after the user terminal obtains the corresponding ringing tone, the ringing tone may be configured to be the active ringing tone of the user terminal according to the instruction on the network side—control MO or calling signaling, or may be configured manually by the user to be the active ringing tone of the user terminal, so that the synchronization between the ringing tone and the ring back tone may be realized for the same user terminal. Thus, the calling party and the called party may hear the same ringtone, and better service experiences may be achieved.

In the embodiments of the invention, when the ringing tone configuration is accomplished via the user terminal, the result of the ringing tone configuration is reported to the ring back tone platform. The ring back tone platform classifies the ring back tone corresponding to the ringing tone into the ring back tone pool of this user terminal according to the result of the ringing tone configuration. Thus the ringing tone is converted into the ring back tone.

Further, in the embodiments of the invention, after the ring back tone platform classifies the ring back tone corresponding to the ringing tone into the ring back tone pool of the user terminal, this ring back tone may also be configured to be the active ring back tone of this user terminal, so that the synchronization between the ringing tone and the ring back tone may be realized for the same user terminal. Thus, the calling party and the called party may hear the same ringtone, and better service experiences may be achieved.

It should be emphasized that the above-described embodiments, particularly, any preferred embodiments, are merely possible examples of implementations, merely set forth for a clear understanding of the principles of the invention. Many variations and modifications may be made to the above-described preferred embodiments without departing substantially from the spirit and principles of the invention. All such modifications and variations are intended to be included herein within the scope of this disclosure and the above-described preferred embodiments and protected by the following claims.

What is claimed is:

1. A method for configuring a ringing tone according to a ring back tone, comprising:
   sending, by a user terminal, a ring back tone configuration request to a ring back tone platform;
   configuring, by the ring back tone platform, ring back tone information for the user according to the ring back tone configuration request;
   sending, by the user terminal, a ringing tone configuration request to the ring back tone platform;
   determining, by the ring back tone platform, a relevant data of a corresponding ringtone information according to a corresponding relationship between the ringtone information and the ring back tone information;
   finding, by the ring back tone platform, the relevant data of the corresponding ringtone information from a ring back tone data base of the ring back tone platform;
   sending, by the ring back tone platform, the relevant data of the corresponding ringtone information to the user terminal; and
   configuring, by the user terminal, the ringing tone according to the relevant data of the corresponding ringtone information,
   wherein the relevant data of the corresponding ringtone information is a ringing tone data or a download link information of the ringing tone data,
   wherein the process of obtaining the ringing tone by the terminal of the user comprises:
     sending, by the ring back tone platform, a result of the ring back tone configuration to a ringing tone download server when the relevant data is the download link information of the ringing tone; and
     providing, by a ringing tone download server, the terminal of the user with ringing tone data corresponding to the result of the ring back tone configuration,
   wherein the process of providing the ringing tone data by the ringing tone download server comprises:
     constructing, by the ringing tone download server, a Push message carrying description information of the ringing tone, and sending the Push message to the terminal of the user; or
     providing, by the ringing tone download server, a Push Proxy Gateway, PPG, with ringtone information corresponding to the result of the ring back tone configuration; sending, by the PPG, the Push message constructed according to the ringtone information; the terminal of the user connecting to a Wireless Application Protocol, WAP, gateway according to the Push message; and providing, by the ringing tone download server, the terminal of the user with the ringing tone corresponding to the result of the ring back tone configuration via the WAP gateway.

2. The method according to claim 1, wherein the process of sending the relevant data to the user terminal comprises:
   dispatching, by a ring back tone, the relevant data of the ringing tone corresponding to the ring back tone to a Device Management Server, DMS; and
   dispatching, by the DMS, the relevant data to a user terminal.

3. The method according to claim 2, wherein the DMS dispatching the relevant data to the user terminal comprises dispatching, by the DMS, the relevant data to the user terminal via sending a Management Object, MO, for dispatching the relevant data to the user terminal, or via operating an MO already available in the user terminal for dispatching the relevant data.

4. The method according to claim 3, wherein the relevant data is a ringing tone data, wherein the DMS obtains ringtone information of the user terminal, and wherein either the DMS dispatches the ringing tone to the user terminal as the ringing tone does not exist, or the DMS dispatches directly the ringing tone to the user terminal as the ringing tone does not exist.

5. The method according to claim 3, wherein the relevant data is a download link information of the ringing tone, wherein the DMS obtains the ringtone information in the user terminal, and wherein either the DMS sends a download link and a download command to the user terminal as the ringing tone does not exist, or the DMS sends directly the download link and the download command to the user terminal as the ringing tone does not exist.

6. The method according to claim 2, wherein the ring back tone platform instructs the DMS correspondingly to configure a ringing tone for the user terminal after receiving an instruction of configuring a terminal ringing tone, and wherein either the DMS configures the ringing tone by sending a configuring MO to the user terminal and operating the configuring MO in accordance with the instruction sent by the ring back tone platform, or the DMS configures the ringing tone by operating the configuring MO available in the user terminal directly in accordance with the instruction sent by the ring back tone platform.

7. The method according to claim 6, wherein the instruction of configuring the terminal ringing tone received by the ring back tone platform carries a configuration strategy of the terminal ringing tone, wherein the configuration strategy comprises a ringing duration to be configured for the ringing tone, wherein the configuring MO sent by the DMS comprises:
   a configuring the ringing tone MO; and
   a scheduling MO for processing the ringing duration,
   wherein the DMS configures a scheduled task logic for the scheduling MO in accordance with the ringing duration, and
   wherein the scheduling MO triggers a task logic to operate a ringing tone MO for configuring a ringing tone for the user terminal when trigger conditions of the scheduling MO are fulfilled.

8. The method according to claim 2, wherein the ring back tone platform instructs the DMS to download a ringing tone for the user terminal after receiving the instruction of downloading the terminal ringing tone, and wherein the ringing tone number corresponds to the number of the ring back tone.

9. The method according to claim 2, further comprising:
   obtaining, by a switching center, a number corresponding to the ring back tone from the ring back tone platform during a call connection;

sending, by a switching center, a CONNECT instruction carrying the number to the user terminal;
parsing, by the user terminal, the number contained in the CONNECT instruction;
searching locally for a ringing tone according to the number; and
configuring the ringing tone to be a ringing tone of the user terminal after the ringing tone corresponding to the number is found.

10. The method according to claim 1, wherein before providing the PPG with the ringtone information, the method further comprises:
inquiring, by the ringing tone download server, an online list in the WAP gateway; and
providing the PPG with the ringtone information when a message processing unit of the terminal of the user is online.

11. The method according to claim 10, further comprising:
sending an online message to the WAP gateway when the message processing unit of the terminal of the user is turned on, and sending an offline message to the WAP gateway when the message processing unit of the terminal of the user is turned off, wherein the online message or the offline message carries an ID of the message processing unit;
either adding, by the WAP gateway, the ID of the message processing unit of the terminal of the user into the online list according to the online message, or deleting the ID of the message processing unit of the terminal of the user from the online list according to the offline message; and
deleting, by the WAP gateway, the ID of the message processing unit of the terminal of the user from the online list, as an online time length of the message processing unit of the terminal of the user is larger than a valid time threshold configured.

12. The method according to claim 10, further comprises:
buffering, by the ringing tone download server, the ringtone information in a message queue, as the message processing unit of the terminal of the user is offline by inquiring of the online list; and
providing the PPG with the ringtone information as the message processing unit of the terminal of the user is online.

13. The method according to claim 12, wherein determining that the message processing unit of the terminal of the user is online comprises:
determining by inquiring periodically of the online list maintained by the WAP gateway; or
receiving a notification sent by the WAP gateway as the WAP gateway determines that the message processing unit of the terminal of the user is online.

14. A system for configuring a ringing tone according to a ring back tone, comprising:
a network element configured to:
receive a ring back tone configuration request from a user terminal;
configure ring back tone information for the user terminal according to the ring back tone configuration request;
receive a ringing tone configuration request from the user terminal;
determine relevant data of a corresponding ringtone information according to a corresponding relationship between the ringtone information and the ring back tone information;
find the relevant data of the corresponding ringtone information from a ring back tone data base of a ring back tone platform; and
send, by the ring back tone platform, the relevant data of a corresponding ringtone information to the user terminal, wherein the user terminal configures the ringing tone according to the relevant data of the corresponding ringtone information,
wherein the relevant data of the corresponding ringtone information is a ringing tone data or download link information of the ringing tone data, and
wherein the network element comprises:
a ringing tone download server on the network side, configured to provide the user terminal with the relevant data of the ringing tone corresponding to the ring back tone configuration information according to the ring back tone configuration information notified by the ring back tone platform; and
a gateway, configured to transmit information exchanged between the user terminal and the ringing tone download sever,
wherein the gateway comprises a Push Proxy Gateway, PPG, and a Wireless Application Protocol, WAP gateway,
wherein the PPG is configured to construct a Push message according to the ringtone information from the ringing tone download server, and send the Push message containing the ringing tone download information to the user terminal, and
wherein the WAP gateway is configured to transmit a ringing tone downloading request and ringing tone exchanged between the user terminal and the ringing tone download server.

15. The system according to claim 14, wherein the network element comprises:
a ring back tone platform, configured to determine the relevant data of the ringing tone corresponding to the ring back tone configured; and
a device management device, DMS, configured to forward the relevant data determined by the ring back tone platform to the user terminal.

16. The system according to claim 14, further comprising a user terminal, wherein the user terminal comprises a message processing unit, configured to send an online message when it is turned on, and send an offline message when it is turned off, wherein the online message or the offline message carries an ID of the message processing unit, and wherein the WAP gateway either adds the ID of the message processing unit of the user terminal into the online list according to the online message, or deletes the ID of the message processing unit of the user terminal from the online list according to the offline message.

17. The system according to claim 16, wherein the ringing tone download server comprises:
an inquiring unit, configured to inquire about the ID of the message processing unit of the user terminal contained in the online list maintained by the WAP gateway, and determine whether the message processing unit of the user terminal is online; and
a ringtone information processing unit, configured to either buffer the ringtone information in a message queue, or provide the PPG with the ringtone information,
wherein when the inquiring unit determines that the message processing unit of the user terminal is offline, the ringtone information processing unit buffers the ringtone information in the message queue, and
wherein when the inquiring unit determines that the message processing unit of the user terminal is online, the ringtone information processing unit provides the PPG with the ringtone information.

18. The system according to claim 17, wherein when the message processing unit of the user terminal is offline, the inquiring unit inquires periodically of the WAP gateway about the online list, or wherein the inquiring unit requests the WAP gateway to send a notification when the message processing unit of the user terminal is online.

19. The system according to claim 14, wherein the WAP gateway is further configured to delete the ID of the message processing unit of the user terminal from the online list when an online time length of the message processing unit of the user terminal is larger than a valid time threshold configured.

* * * * *

UNITED STATES PATENT AND TRADEMARK OFFICE
CERTIFICATE OF CORRECTION

PATENT NO. : 8,355,704 B2  
APPLICATION NO. : 11/935896  
DATED : January 15, 2013  
INVENTOR(S) : Xin Yang et al.

Page 1 of 1

It is certified that error appears in the above-identified patent and that said Letters Patent is hereby corrected as shown below:

On title page, add:

Item (63) Related U.S. Application Data

Continuation of application No. PCT/CN2007/070709, filed on Sep. 17, 2007.

Signed and Sealed this
Fourteenth Day of May, 2013

Teresa Stanek Rea
*Acting Director of the United States Patent and Trademark Office*